United States Patent
Ishii et al.

(10) Patent No.: US 9,088,709 B2
(45) Date of Patent: Jul. 21, 2015

(54) IMAGE PROCESSING APPARATUS AND METHOD FOR CONTROLLING THE SAME, AND IMAGE PICKUP APPARATUS

(71) Applicant: CANON KABUSHIKI KAISHA, Tokyo (JP)

(72) Inventors: Kazunori Ishii, Yokohama (JP); Hirofumi Honda, Machida (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/097,731

(22) Filed: Dec. 5, 2013

(65) Prior Publication Data

US 2014/0168479 A1 Jun. 19, 2014

(30) Foreign Application Priority Data

Dec. 19, 2012 (JP) ................. 2012-277439
Sep. 6, 2013 (JP) ................. 2013-185710

(51) Int. Cl.
H04N 5/232 (2006.01)
H04N 5/235 (2006.01)

(52) U.S. Cl.
CPC ....... *H04N 5/23212* (2013.01); *H04N 5/23219* (2013.01); *H04N 5/23293* (2013.01)

(58) Field of Classification Search
CPC ............ G06K 9/00221–9/00389; G06T 2207/30196–2207/30201; H04N 5/23219; G06F 17/30793
USPC ......... 348/245, 222.1, 78; 382/117, 118, 190; 396/51
See application file for complete search history.

(56) References Cited

U.S. PATENT DOCUMENTS

| | | | |
|---|---|---|---|
| 8,130,282 B2* | 3/2012 | Miura et al. | 348/222.1 |
| 8,179,450 B2* | 5/2012 | Sugimoto | 348/222.1 |
| 2005/0219666 A1* | 10/2005 | Ejima et al. | 358/539 |
| 2007/0263997 A1* | 11/2007 | Hirai et al. | 396/123 |
| 2008/0136958 A1* | 6/2008 | Nakahara | 348/345 |
| 2008/0278587 A1* | 11/2008 | Izawa | 348/207.11 |
| 2009/0091633 A1* | 4/2009 | Tamaru | 348/208.14 |
| 2011/0115940 A1* | 5/2011 | Ojima et al. | 348/222.1 |
| 2014/0043522 A1* | 2/2014 | Hamano | 348/349 |
| 2014/0105454 A1* | 4/2014 | Yoneyama | 382/103 |

FOREIGN PATENT DOCUMENTS

| | | |
|---|---|---|
| JP | 2002-251380 A | 9/2002 |
| JP | 2006-227080 A | 8/2006 |
| JP | 2009-211311 A | 9/2009 |

* cited by examiner

*Primary Examiner* — Tuan Ho
*Assistant Examiner* — Marly Camargo
(74) *Attorney, Agent, or Firm* — Cowan, Liebowitz & Latman, P.C.

(57) ABSTRACT

At least either of a location and a size of a subject area that is detected from an image by a first detection unit is corrected based on information about an area corresponding to the subject area detected by the first detection unit, the area being included in an area that is detected from the image by a second detection unit and in which the subject area can be estimated. A particular subject area can be detected in an image with higher accuracy.

16 Claims, 16 Drawing Sheets

F I G. 6

| FACE AREA CORRECTION | DO NOT CORRECT FACE AREA | DO CORRECT FACE AREA |
|---|---|---|
| FACE ORIENTATION | FRONT | SIDEWAYS |
| DEGREE OF RELIABILITY OF HUMAN BODY DETECTION RESULT | LOW | HIGH |
| DEGREE OF RELIABILITY OF FACE DETECTION RESULT | LOW | HIGH |
| DIFFERENCE BETWEEN FACE SIZE AND ESTIMATED FACE SIZE CALCULATED FROM HUMAN BODY DETECTION RESULT | LARGE | SMALL |
| DIFFERENCE IN CENTER LOCATION BETWEEN FACE AND DETECTED HUMAN BODY OR ESTIMATED FACE CALCULATED FROM HUMAN BODY DETECTION RESULT | LARGE | SMALL |

F I G. 8
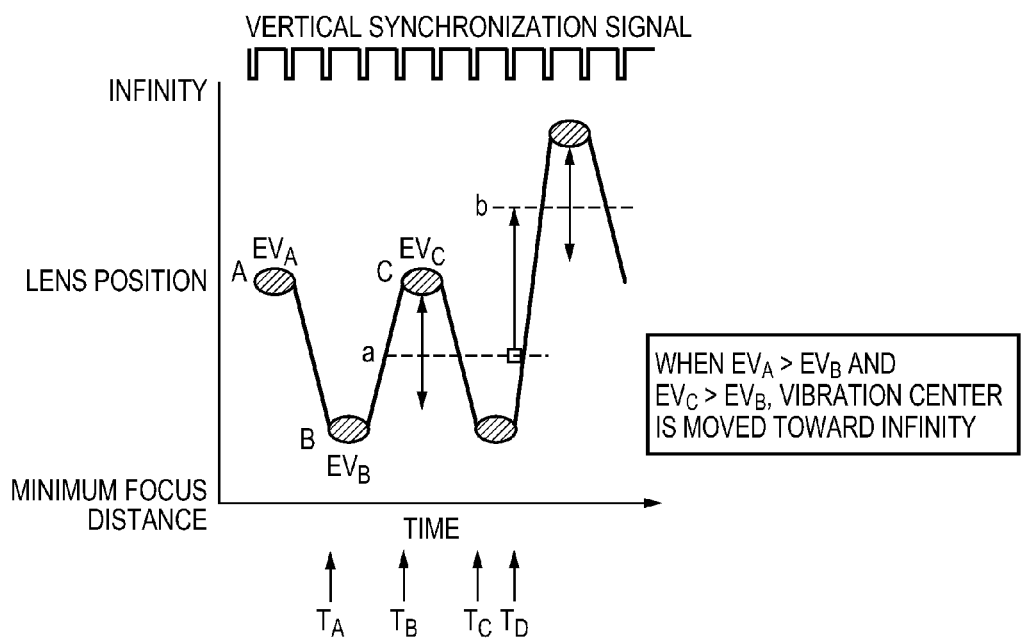
F I G. 9
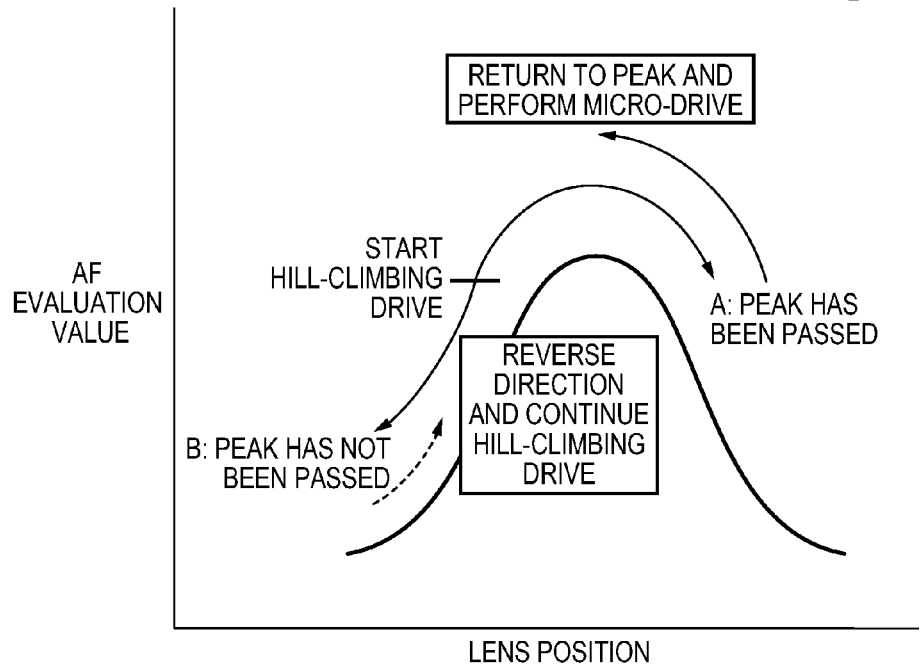

PRIOR ART

F I G. 13A
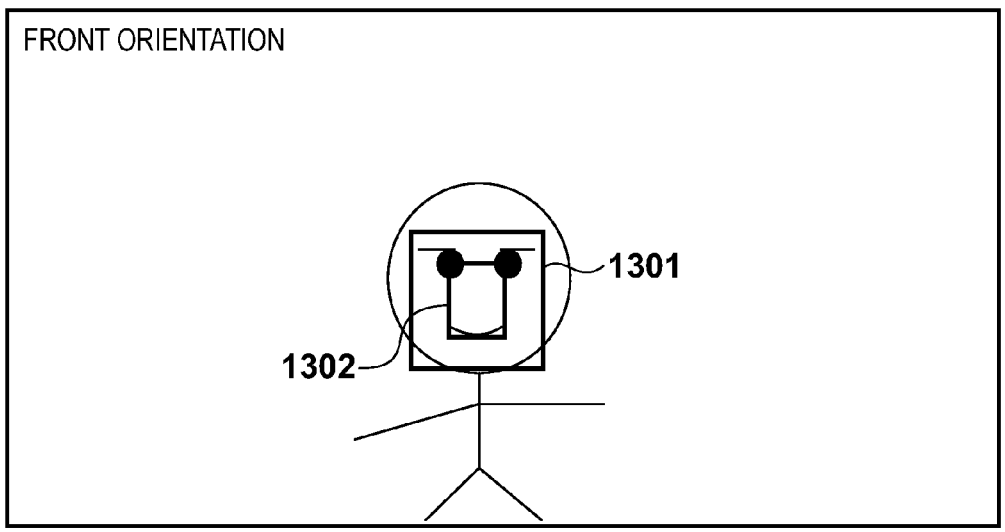
F I G. 13B
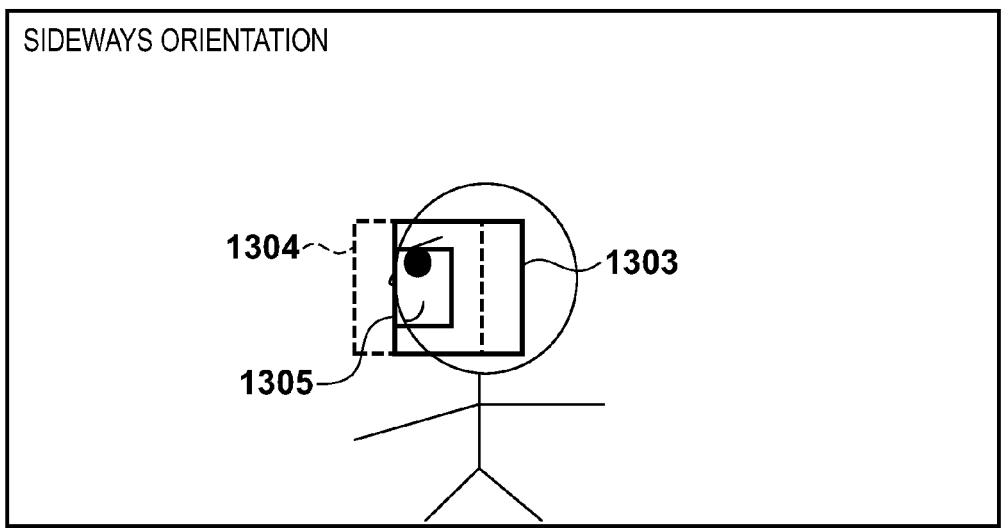

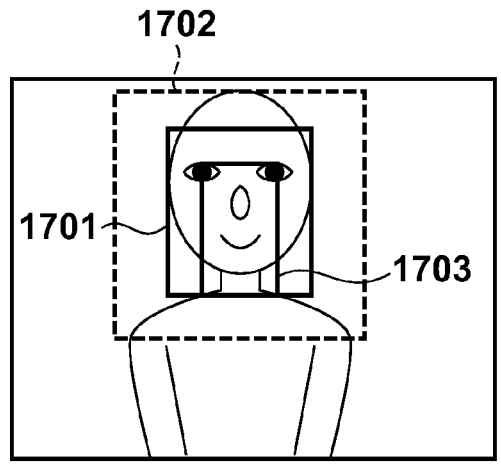
F I G. 17A
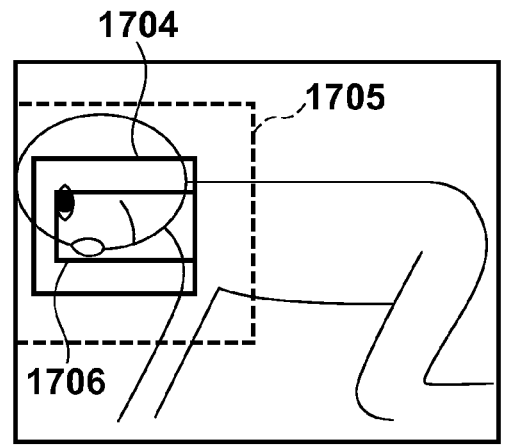
F I G. 17B
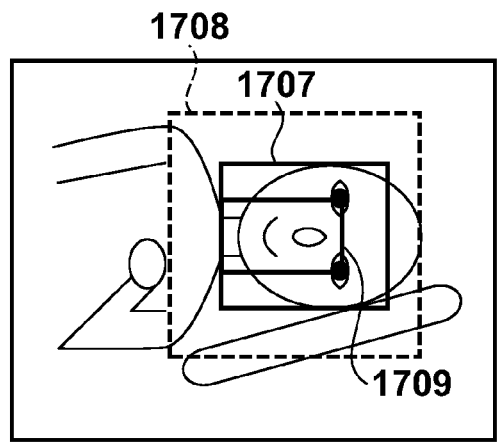
F I G. 17C
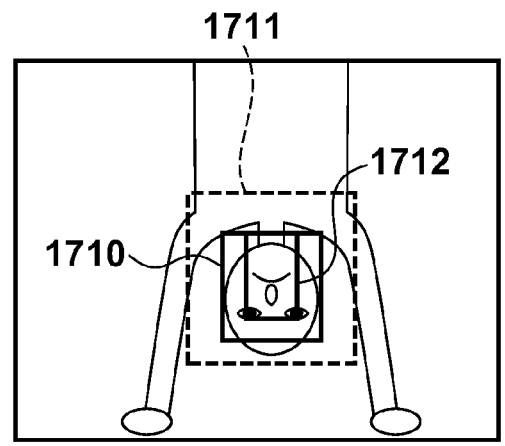
F I G. 17D

IMAGE PROCESSING APPARATUS AND METHOD FOR CONTROLLING THE SAME, AND IMAGE PICKUP APPARATUS

BACKGROUND OF THE INVENTION

1. Field of the Invention

The present invention relates to image processing apparatuses and methods for controlling image processing apparatuses. More particularly, the present invention relates to an image processing apparatus for detecting a subject area in an image and a method for controlling such an image processing apparatus, and an image pickup apparatus.

2. Description of the Related Art

The TV-AF technique, in which an in-focus position is detected based on the sharpness (contrast) of an image signal generated using an image sensor, is widely used for autofocus detection (AF) control in camcorders and the like. Specifically, in the TV-AF technique, an AF evaluation value that indicates the degree of contrast is generated for each of image signals obtained by picking images up at different focusing lens positions, and based on the AF evaluation values, a focusing lens position that provides a highest contrast is searched for as an in-focus position.

An image pickup apparatus is known that has a function of detecting a particular subject in order to, when pickup an image of a person, stably focus on the human subject. For example, an image pickup apparatus has been proposed in which a focus detection area including a recognized face area is set for focus detection (Japanese Patent Laid-Open No. 2006-227080).

As described in Japanese Patent Laid-Open No. 2006-227080 cited supra, when focus detection is performed so that a focus detection area including a detected human face is in focus, the background may be included in the focus detection area, depending on the orientation of the detected human face, for example. In this case, if there is a high-contrast subject in the background included in the focus detection area, the background may be in focus rather than the human face as a result of focus detection.

A frame (face frame) that indicates the face area may be superimposed in order to notify the user (photographer) of the face area that is to be in focus. Similarly, in this case, the face frame may be misaligned with the human face or the size of the face frame may be altered, depending on the orientation of the human face, for example.

For example, when a person faces front as shown in FIG. 10A, the face frame and the focus detection area can be appropriately displayed and set so that almost the entirety thereof matches the face area. However, when a person faces sideways as shown in FIG. 10B, the difference in size between the left and right eyes becomes larger or the distance between the left and right eyes becomes narrower, resulting in a decrease in the accuracy of face detection. In face detection, a face area is often detected whose center is located at the eyes. Therefore, as shown in FIG. 10B, the detected face area may deviate from the actual face area, or the detected face area may be smaller than the actual face area. In particular, when the detected face area deviates from the actual face area, the displayed face frame may be misaligned with the face, and, then if the focus detection area is set to the face area, the background may have a large proportion of the focus detection area, so that the background is more likely to be in focus.

SUMMARY OF THE INVENTION

The present invention has been made in view of the above problems. According to the present invention, in an image processing apparatus that detects a particular subject area in an image, and based on the detected area, performs a control, such as autofocus detection or the like, and in a method for controlling such an image processing apparatus, a subject area can be detected with higher accuracy.

According to one aspect of the present invention, there is provided an image processing apparatus comprising: a first detection unit adapted to detect an area of a first detection subject from an image; a second detection unit adapted to detect, from an image, an area of a second detection subject that allows for an estimation of the area of the first detection subject; a correction unit adapted to correct a location of the area of the first detection subject detected by the first detection unit; a setting unit adapted to set an evaluation area based on the area of the first detection subject; and a control unit adapted to perform at least one of a focus detection control, an exposure control, and a color control based on a signal of an image corresponding to the evaluation area, wherein the correction unit corrects the location of the area of the first detection subject based on information about the area of the second detection subject corresponding to the area of the first detection subject detected by the first detection unit.

According to another aspect of the present invention, there is provided an image pickup apparatus comprising: the image processing apparatus according to the present invention; and an image capture unit adapted to perform photoelectric conversion on an optical image of a subject to generate an image to be provided to the image capture unit.

According to still another aspect of the present invention, there is provided a method for controlling an image processing apparatus, comprising: a first detecting step of detecting an area of a first detection subject from an image; a second detecting step of detecting, from an image, an area of a second detection subject that allows for estimation of the area of the first detection subject; a correcting step of correcting a location of the area of the first detection subject detected in the first detecting step; a setting step of setting an evaluation area based on the area of the first detection subject; and a control step of performing at least one of a focus detection control, an exposure control, and a color control based on a signal of an image corresponding to the evaluation area, wherein in the correcting step, the area of the first detection subject is corrected based on information about the area of the second detection subject corresponding to the area of the first detection subject detected in the first detecting step.

Further features of the present invention will become apparent from the following description of exemplary embodiments with reference to the attached drawings.

BRIEF DESCRIPTION OF THE DRAWINGS

FIG. 6 is a diagram showing example conditions for a face area correction determining process in the first example.

FIG. 8 is a diagram for describing micro-drive of a focusing lens in a TV-AF process.

FIG. 9 is a diagram for describing hill-climbing drive of a focusing lens in the TV-AF process.

FIGS. 13A and 13B are diagrams for describing setting of a face AF frame in the second example.

FIGS. 17A to 17D are diagrams for describing a face AF frame in the third example.

DESCRIPTION OF THE EMBODIMENTS

Exemplary embodiments of the present invention will now be described in detail in accordance with the accompanying drawings.

<Configuration of Image Pickup Apparatus>

A configuration of an image pickup apparatus, particularly a camcorder, to which an image processing apparatus according to an example of the present invention is applied, will be described below. Note that the use of a result of detection of a subject area is not limited to applications relating to image pickup, such as displaying of a subject area frame, setting of a focus detection area, focus detection control, exposure control, and the like. Therefore, it should be noted that a portion of the configuration of the camcorder described below that is not directly involved with the process of detecting a subject area is not essential to the present invention. Note that the image pickup apparatus to which an image processing apparatus according to an example of the present invention is applicable is not limited to a camcorder, and may be a digital still camera. An image processing apparatus according to an example of the present invention may be applied to a piece of equipment including an image pickup apparatus (e.g., a personal computer, a mobile telephone, a tablet terminal, a mobile information terminal, a media player, etc.).

Figure 1:
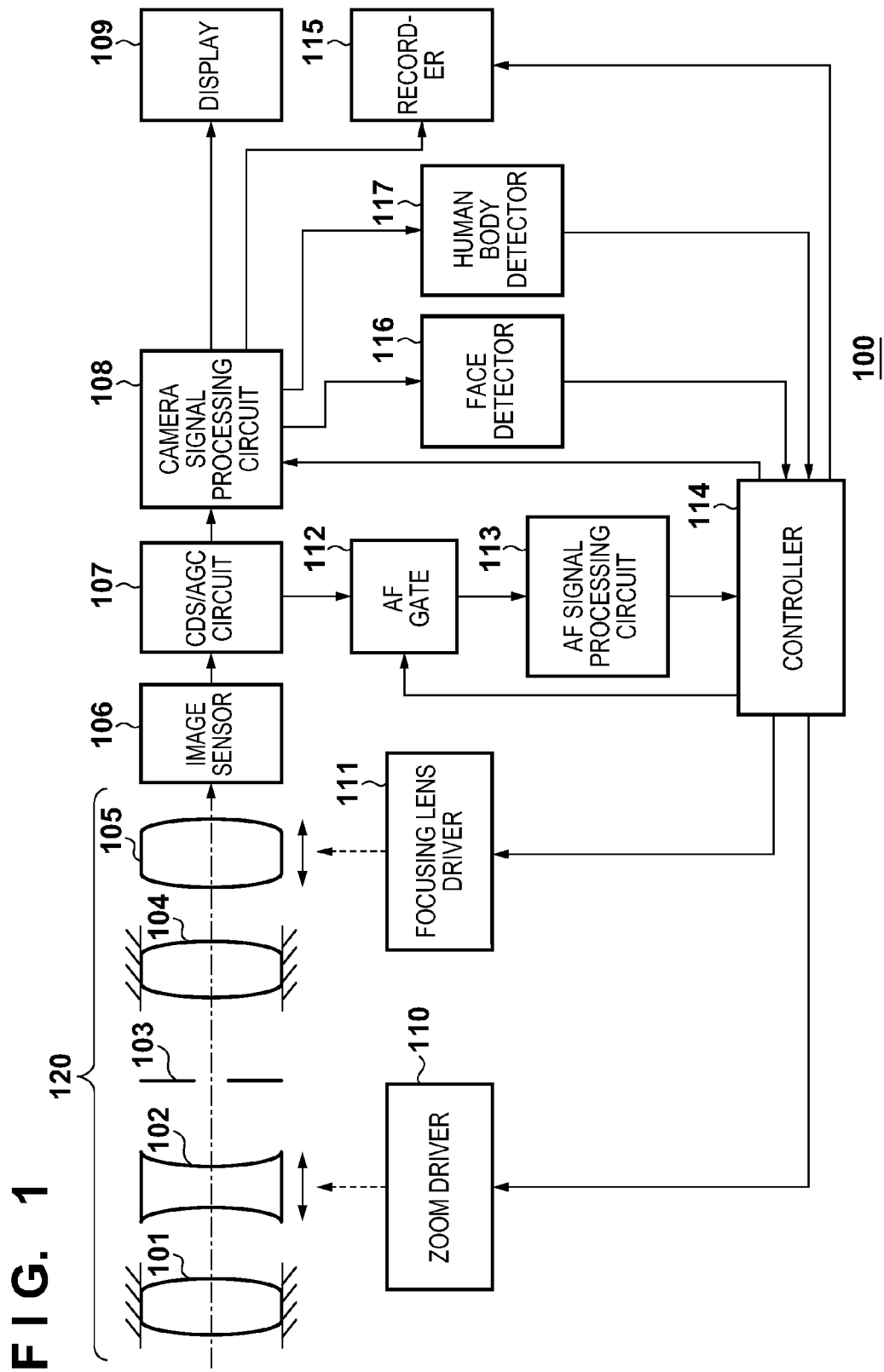
FIG. 1 is a block diagram showing a configuration of a main portion of a camcorder as an example of an image processing apparatus according to an example of the present invention.

In FIG. 1, the digital camcorder 100 of this example includes, as an optical system for image pickup, a zoom lens 120 that supports an AF control. The zoom lens 120 includes a first fixed lens 101, a magnification changing lens 102 that is moved in the direction of an optical axis to change magnification, a diaphragm 103, a second fixed lens 104, and a focus compensator lens 105. The focus compensator lens (hereinafter simply referred to as a focusing lens) 105 has both the function of correcting a movement of a focal plane that is caused by changing of magnification and the function of focusing.

An image sensor 106 includes a photoelectric conversion device, such as a CCD sensor or a CMOS sensor. The image sensor 106 picks up an image of a subject that is formed by the optical system for image pickup, to output an image signal. A CDS/AGC circuit 107 performs correlated double sampling on an output of the image sensor 106, and adjusts a gain applied to the output.

A camera signal processing circuit 108 performs a variety of image processes on an output signal of the CDS/AGC circuit 107 to generate a video signal. A display 109 includes an LCD or the like to display the video signal from the camera signal processing circuit 108. A recorder 115 records the video signal from the camera signal processing circuit 108 to a recording medium (e.g., a magnetic tape, an optical disk, a semiconductor memory, etc.).

A zoom driver 110 moves the magnification changing lens 102 under control of a controller 114. A focusing lens driver 111 moves the focusing lens 105 under control of the controller 114. The zoom driver 110 and the focusing lens driver 111 include an actuator, such as a stepper motor, a DC motor, a vibration motor, a voice coil motor, or the like.

An AF gate 112 supplies, to a following-stage AF signal processing circuit 113, only a portion of output signals of all pixels from the CDS/AGC circuit 107, i.e., signals of pixels in an area (a focus detection area or an AF frame) used for focus detection that is set by the controller 114.

The AF signal processing circuit 113 extracts a component of a predetermined frequency band using, for example, a filter from pixel signals of the focus detection area supplied from the AF gate 112, to generate an AF evaluation value. The extracted component may be, for example, a high-frequency component or a luminance difference component (a difference between a highest value and a lowest value of luminance levels of signals passing through the AF gate 112).

The AF evaluation value is output to the controller 114. The AF evaluation value represents a sharpness (a degree of contrast) of a video that is generated based on an output signal of the image sensor 106. The sharpness of a video is high when the video is in focus and low when the video is blurred, i.e., out of focus. Therefore, the sharpness of a video can be used as a value representing the state of focus of the optical system for image pickup.

The controller 114, which is, for example, a microcomputer, performs a control program previously stored in a ROM (not shown) to control parts of the digital camcorder 100, thereby control the operation of the entire digital camcorder 100. The controller 114 controls the focusing lens driver 111 based on the AF evaluation value supplied from the AF signal processing circuit 113 to perform a TV-AF type AF control process (hereinafter simply referred to as a "TV-AF control").

A face detector 116 applies a face detecting process that is based on a known face detection technique to an image signal output from the CDS/AGC circuit 107, thereby detecting a face area that is an area of a first detection subject, as an example human area in an image. Examples of the known face detection technique include: a technique based on learning using a neural network or the like; a technique of searching an image for a part having a characteristic shape, such as the eyes, nose, mouth, or the like, using template matching, and if the part has a high similarity, recognizing the part as a face; and the like. In addition, many other techniques have been proposed, including a technique of detecting an image feature amount, such as the skin color or the shape of the eye, and applying statistical analysis to the image feature amount, for example. These techniques may be typically used in combination of two or more to improve the accuracy of face detection. Specifically, for example, face detection may be performed using wavelet transform and an image feature amount as described in Japanese Patent Laid-Open No. 2002-251380. The face detector 116 may perform the face detecting process every several frames or every frame.

The face detector 116 outputs information that can be used to specify a location and a size in an image, a degree of reliability of the detection result, or the like for each of areas (face areas) detected as, for example, a human face, as a result of face detection, to the controller 114. Based on the face detection result, the controller 114 instructs the AF gate 112 to set the focus detection area to an area including a face area in the image.

Here, if the face detector 116 has detected a plurality of human faces, the controller 114 ranks the faces in order of priority based on the locations or sizes of the faces or in accordance with the photographer's instruction, and determines and selects a face having a highest priority level as a main face. For example, the controller 114 may give the highest priority level to a face selected in accordance with the photographer's instruction, and for the other faces, may give a higher priority level to a face that is closer to the center of the screen and/or has a larger face size. The faces may be ranked in order of priority using other procedures.

A human body detector 117 performs a known human body detecting process on the image signal to detect, in the picked up image, a human body that is an area of a second detection subject. The human body detector 117 outputs, as a result of human body detection, information that can be used to specify a location and a size in the image, the degree of reliability of the detection result, or the like for each of areas (human body areas) detected as, for example, a human body, to the controller 114. In this example, the controller 114 estimates a face area based on the human body detection result. The technique of estimating a face area based on the human body detection result is not particularly limited. For example, when a human body shape of the upper body or the chest and parts above the chest has been detected as a human body area, a head area can be found out from the shape of the human body area. A relationship between locations or sizes of a head area and a face area can be statistically obtained in advance. Therefore, when a head area has been found out, a location or a size of a face area can be estimated. The controller 114 determines a final face area based on the human body detection result and the face detection result. The human body detector 117 may perform the detection process every several frames or every frame.

The technique with which the human body detector 117 detects a human body area is not particularly limited. For example, a technique described in Japanese Patent Laid-Open No. 2009-211311 may be employed. Specifically, local edge strengths of a contour of the upper body are detected as local feature amounts using a Sobel filter, a Prewitt filter, a Haar filter, or the like, and based on the extracted local feature amounts, it is determined whether or not each human area is of the upper body. This determination may be performed based on machine learning, such as AdaBoost learning or the like. Note that, in Japanese Patent Laid-Open No. 2009-211311 cited supra, an image picked up by a surveillance camera is processed, and therefore, the image is taken diagonally from above. The detection of a human body area from a contour is not limited to images taken diagonally from above.

Here, the particular subject whose appearance varies depending on the orientation is a human face. As another technique of estimating a location of a human face, the use of human body detection is illustrated. Of course, the particular subject may be an animal face or any other subjects. The present invention is applicable to any subjects for which a first detection technique of detecting an area of a particular subject and a second detection technique of estimating a location of the area of the particular subject can be used. For example, the second detection technique may be a technique of detecting an area including an area that is to be detected by the first detection technique, particularly an area in which a location of the area that is to be detected by the first detection technique can be specified or estimated.

The controller 114, for example, superimposes, via the camera signal processing circuit 108, a subject area frame on a video signal displayed by the display 109 in order to present, to the photographer, information about a subject area detected by face detection, human body detection, or the like. As a result, the subject area frame is superimposed on the video, whereby the photographer is allowed to recognize the subject area detected by the digital camcorder 100.

In this example, in order to estimate a location of a human face based on a detected human body area, the human body detector 117 performs human body detection within a range including a range within which the face detector 116 performs face detection.

<AF Control Process in First Example>

Next, the AF control process performed by the controller 114 will be described with reference to a flowchart shown in FIG. 2.

This process is performed in accordance with a computer program stored in the controller 114, and is repeatedly performed in cycles during which a picked up image signal is read from the image sensor 106 in order to generate a field of image.

Initially, in S201, the controller 114 obtains, from the face detector 116, a result of the face detecting process that has been performed on a most recent image signal.

In S202, the controller 114 obtains, from the human body detector 117, a result of the human body detecting process that has been performed on the most recent image signal.

Next, in S203, based on the face detection result and the human body detection result obtained in S201 and S202, the controller 114 determines whether or not the same subject has been detected. This process will be described in detail below.

In S204, based on the face detection result obtained in S201, the controller 114 determines whether or not a human face has been detected. If the determination result is positive, control proceeds to step S206. Otherwise, control proceeds to step S205.

In S205, the controller 114 sets an AF frame (focus detection area) at a predetermined fixed location (e.g., a center) in an image pickup range, and sends information about the AF frame to the AF gate 112. Thereafter, in S211, the controller 114 performs a TV-AF control based on an image signal corresponding to the inside of the AF frame. The TV-AF control will be described in detail below.

In S206, the controller 114 performs a main-face determining process. The main-face determination is a process of designating, as a main face, one of the face areas detected by the face detector 116 that has a highest priority level, where the face areas are ranked in order of priority based on a face location or a face size or in accordance with the photographer's instruction. In the main-face detection, a higher priority level may be given to a face that is located closer to the center of the screen. Alternatively, a priority level may be given under some conditions. For example, the highest priority level may be given to a face selected by the photographer's instruction, the second highest priority level may be given to a face closest to the center of the screen, and the third highest priority level is given to a face having a largest size.

In S207, based on the results of S203 and S206, the controller 114 determines whether or not the human body area has been detected from the same subject as that of the face area detected by the face detector 116. If the determination result is positive, control proceeds to step S208. Otherwise, control proceeds to step S209.

In S208, based on the result of detection of the human body area and the face area that have been determined to belong to the same subject, the controller 114 performs a face area correcting process of correcting the face detection result obtained by the face detector 116. The face area correcting process will be described in detail below. If the controller 114 ends the face area correcting process, control proceeds to step S209.

In S209, the controller 114 superimposes an indication of the face area of the main face determined in S206, e.g., a frame-shaped indication (face frame), onto a video signal displayed on the display 109 (S209). Note that a face frame may be displayed for other face areas in addition to the main face. In this case, for faces other than the main face, a face frame having a color, a shape, a way of indication, or the like that is different from that for the main face may be displayed. For example, a double face frame may be displayed for the face area of the main face, and a single face frame may be displayed for other face areas.

In S210, the controller 114 sets the AF frame based on a location of the main face so that the main face is in focus. In S211, the controller 114 performs the TV-AF control.

Note that the TV-AF control process is a combination of micro-drive and hill-climbing drive. The TV-AF control process attempts to maximize the AF evaluation value. To do so, the TV-AF control process determines whether the AF evaluation value is increased or decreased while driving the focusing lens, thereby searching for an in-focus position. The TV-AF control process itself is performed using a known technique.

Next, the same-subject determining process in S203 of FIG. 2 will be described with reference to a flowchart shown in FIG. 3.

In S301, the controller 114 calculates the number of detected human faces based on the face detection result obtained from the face detector 116. Thereafter, in S302, if the number of detected human faces is zero or less than or equal to a count described below (Yes), the controller 114 ends this process.

Otherwise, i.e., if the number of detected human faces is more than the count described below (No in S302), the controller 114 performs step S303 and following steps for each of the detected face areas. In S303, the controller 114 determines whether or not a human body area encompassing a face area to be processed has been detected.

If the determination result is positive (Yes in S303), the controller 114 determines that both of the areas are of the same subject. Thereafter, in S304, the same identifier ID is assigned to the detection results of the face area and the human body area that have been determined to be those of the same subject, and thereafter, control proceeds to step S305. Otherwise (No in S303), the controller 114 causes the procedure to proceed to step S305.

In S305, the controller 114 increases by one the count indicating the number of processed face areas, and control returns to S302. The controller 114 repeatedly performs steps S303 to S305 until step S303 and following steps have been performed on all of the detected face areas, and thereafter, ends the process.

Therefore, in S207, the controller 114 can determine whether or not a face area and a human body area that belong to the same subject have been detected, by determining whether or not there are detection results assigned the same identifier ID.

Figure 4A:
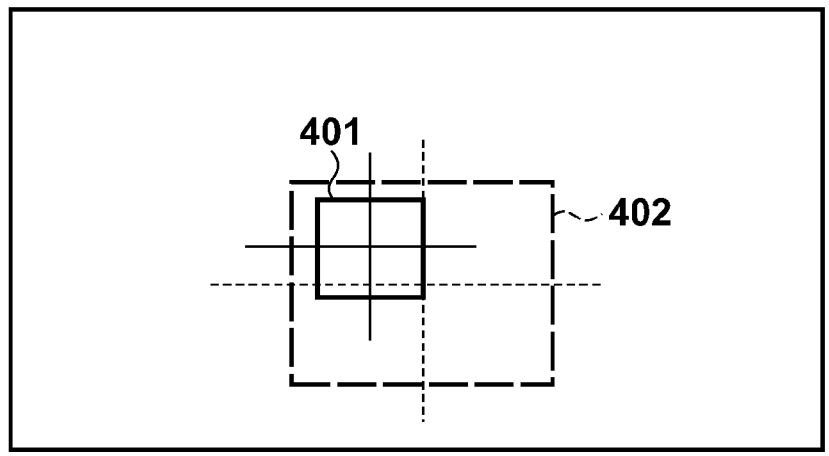
FIGS. 4A to 4C are diagrams showing a determination technique in the same-subject determining process of the first example.
Figure 4B:
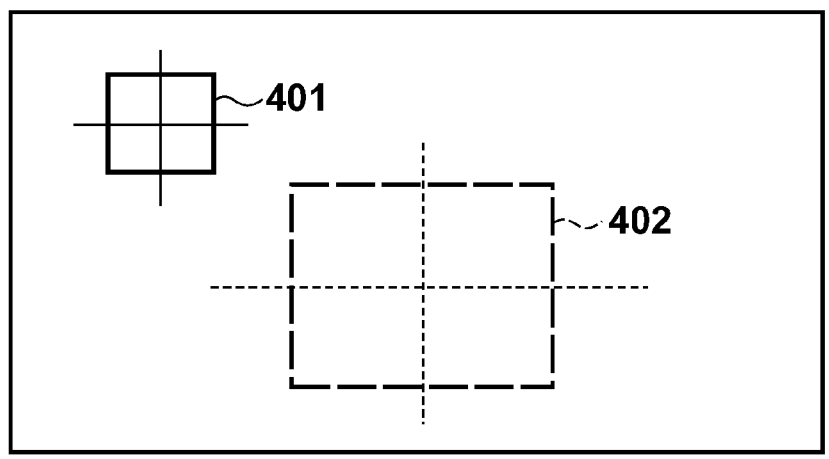
Figure 4C:
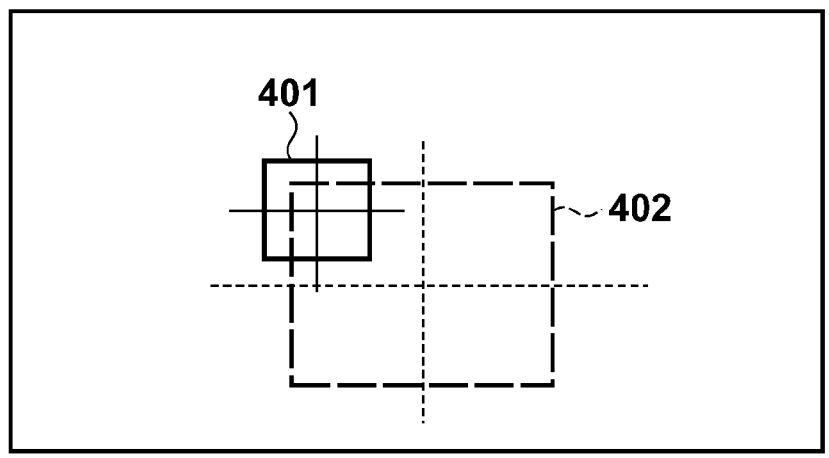

Note that the determination technique in S303 will be further described with reference to FIGS. 4A to 4C. In FIGS. 4A to 4C, for ease of illustration and understanding, only one detected face area and one detected human body area are shown. FIG. 4A shows that a detected face area 401 is encompassed (entirely included) in a human body area 402. FIG. 4B shows that a detected face area 401 is located away from a human body area 402. FIG. 4C shows that a detected face area 401 is partially included in a human body area 402.

In this example, if there is a human body area including a face area, it is determined that both of the areas belong to the same subject. Therefore, of the locational relationships shown in FIGS. 4A to 4C, only in the case of FIG. 4A where the face area 401 is encompassed (entirely included) in the human body area 402, it is determined that both of the areas belongs to the same subject.

Note that the above determination technique is merely illustrative, and other references may be used for the determination. For example, even when a face area is not entirely included in a human body area, then if the face area and the human body area overlap to a predetermined degree or more, it may be determined that both of the areas belong to the same subject. A locational relationship between the detected face area and a face area (head area) estimated based on a contour of the human body area may be additionally taken into consideration. For example, if a distance between coordinates of a center of the head area estimated based on the human body area and coordinates of a center of the detected face area is less than a predetermined value, it may be determined that both of the areas belong to the same subject. This allows for higher accurate determination.

Figure 5:
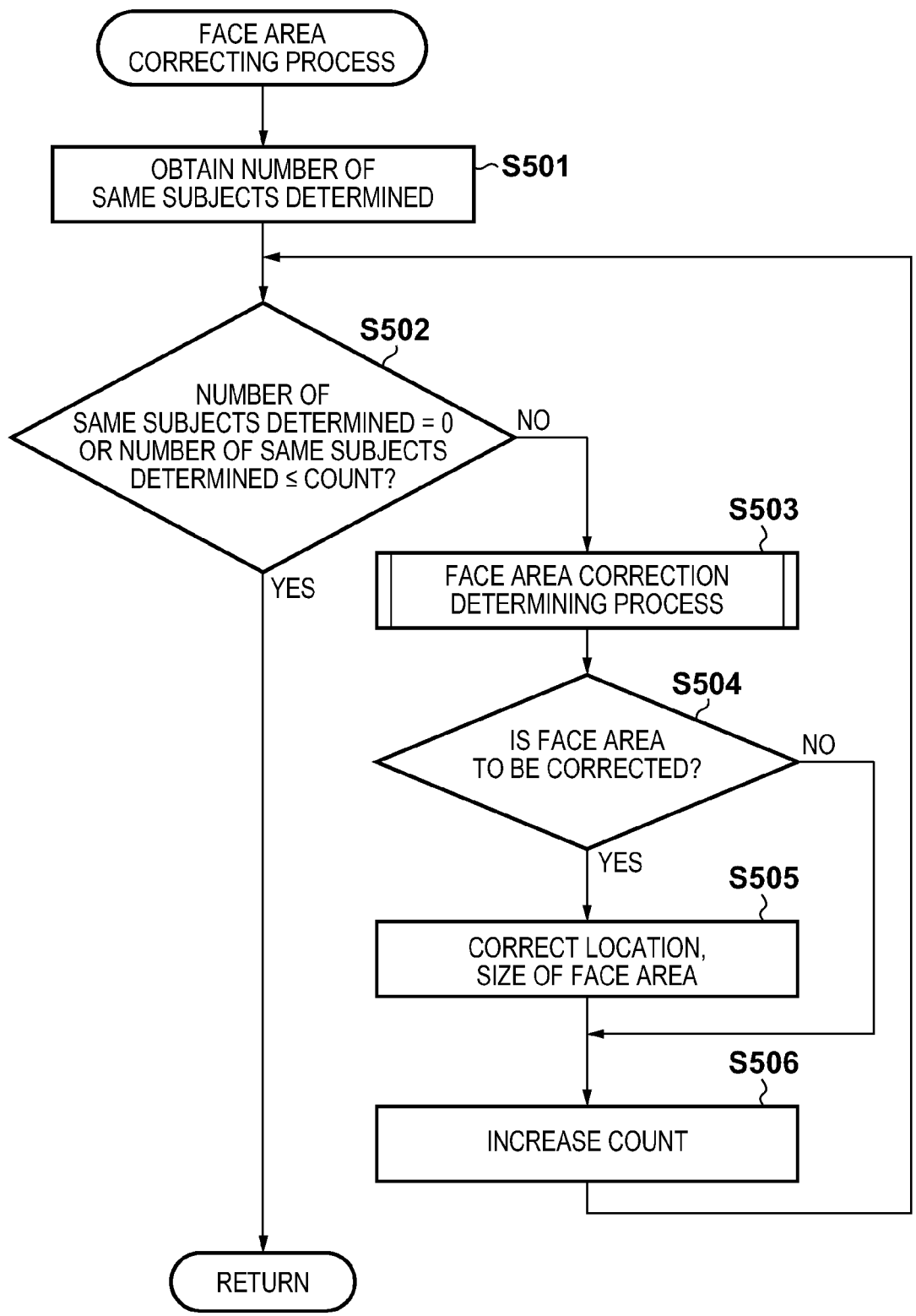
FIG. 5 is a flowchart showing a face area correcting process in the first example.

Next, the face area correcting process in S208 of FIG. 2 will be described with reference to a flowchart shown in FIG. 5.

Initially, in S501, the controller 114 calculates the number of subjects for which it has been determined that both a face area and a human body area have been detected, based on the same identifier ID assigned by the same-subject determining process of S203 as described above.

Thereafter, in S502, if the number of subjects for which it has been determined that both a face area and a human body area have been detected is zero or less than or equal to a count described below (Yes), the controller 114 ends this process.

Otherwise, i.e., if the number of subjects for which it has been determined that both a face area and a human body area have been detected is more than the count (No in S502), the controller 114 performs step S503 and following steps for each subject for which it has been determined that both a face area and a human body area have been detected.

In S503, the controller 114 performs a face area correction determining process of determining whether to correct the face detection result (specifically, a location or a size of the face area) based on the human body detection result that they have been determined to belong to the same subject, i.e., to be assigned the same identifier ID. The face area correction determining process will be described below.

In S504, the controller 114 determines whether or not the face area correction determining process has determined that the face detection result is to be corrected. If the determination result is positive (Yes in S504), in S505 the controller 114 corrects the face detection result (specifically, a location and a size of the face area) based on a location and a size of the face area estimated based on the human body detection result having the same identifier ID. Although, in this example, the location and size of a face area are corrected, at least one of the location and size of a face area may be corrected. If the determination result is negative (No in S504), the controller 114 causes the procedure to proceed to step S506.

In S506, the controller 114 increases the count indicating the number of processed subjects, and control returns to S502. The controller 114 repeatedly performs steps S503 to S506 until step S503 and following steps have been performed on all of the subjects for which it has been determined that both a face area and a human body area have been detected.

The face area correction determining process in S503 of FIG. 5 will be described in detail. In the face area correction determining process of this example, it is determined whether or not the face area result is to be corrected, based on conditions shown in FIG. 6. Note that it can be arbitrarily determined which and how many of the five conditions of FIG. 6 are used.

(Condition 1: Orientation of Face)

Figure 10A:
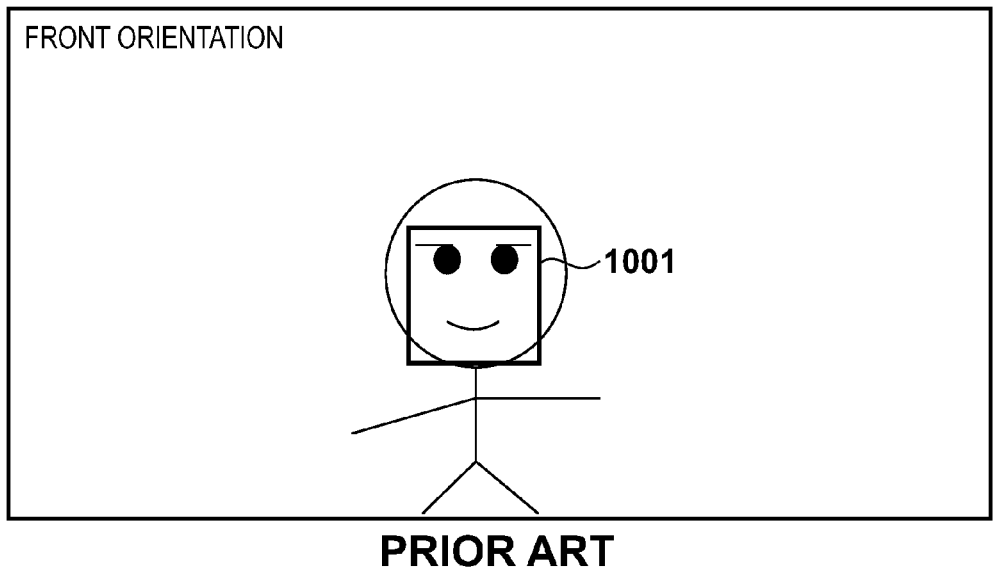
FIGS. 10A and 10B are diagrams for describing the background art related to the present invention.
Figure 10B:
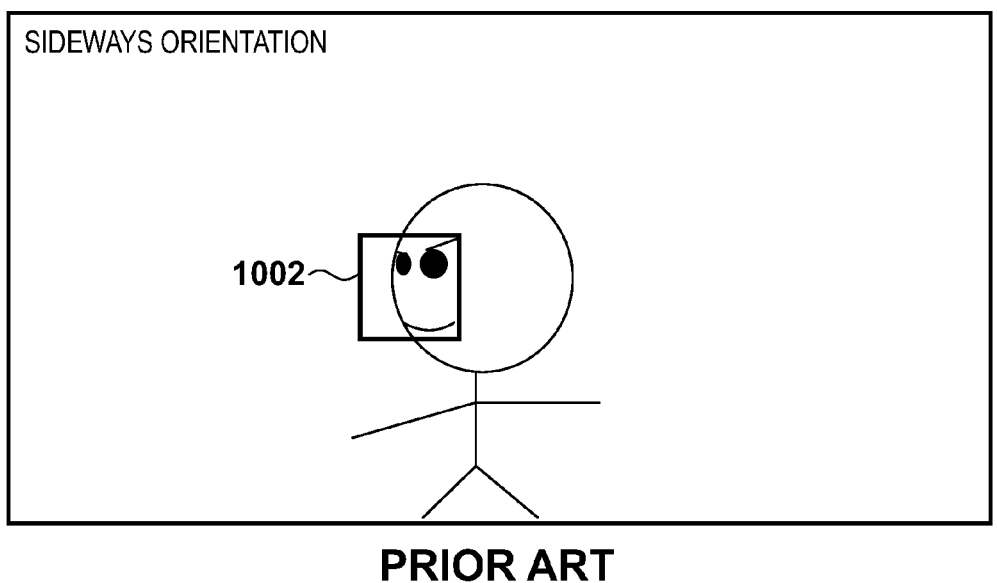

Does the face area detected by the face detector 116 include a face that points in a front orientation (or in a sideways orientation)? If the face area includes a face that points in a front orientation, as shown in FIG. 10A a center of a detected face area 1001 substantially coincides with a center of a human face, and therefore, there are no or few, if any, background pixels contained in the face area 1001. However, if the face area includes a face that points in a sideways orientation, as shown in FIG. 10B a center of a face area 1002 does not coincide with a center of a face, and therefore, many background pixels are contained in the face area 1002. Therefore, when autofocus detection is performed using an area corresponding to the face area as a focus detection area, the background is highly likely to be in focus. Also, when an automatic exposure control is performed in order to achieve correct exposure for the face area, the automatic exposure control is more likely to be affected by the luminance of the background.

Figure 7A:
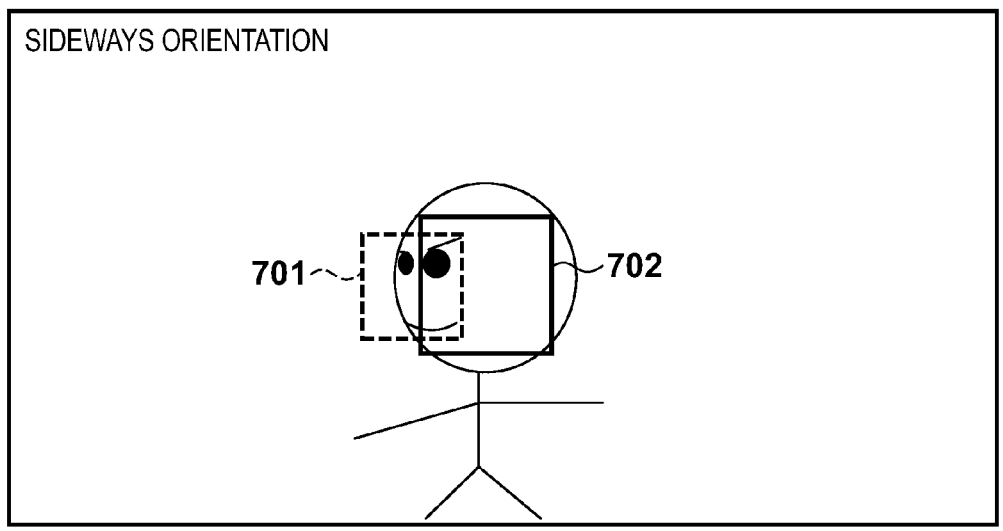
FIGS. 7A and 7B are diagrams showing the face area correcting process of the first example.

Therefore, if the detected face area is of a face that points in a sideways orientation, as shown in FIG. 7A the face area correcting process is performed. The face area correcting process will be described in detail below. Note that it may be determined whether or not a face that points in a sideways orientation has been detected, based on a difference in size between the left and right eyes, a distance between the eyes (the distance is narrower when a face points in a sideways orientation), or the like.

(Condition 2: Degree of Reliability of Human Body Detection Result)

If the degree of reliability of the human body detection result is low, the face area correction is not performed. If the degree of reliability is high, the face area correction is performed. If the degree of reliability is low, erroneous detection is likely to have occurred, and in addition, the location and size of the human body area are likely to be less accurate. If the face area correction is performed based on the human body area having low detection accuracy, an error is likely to occur in the face area correction.

The degree of reliability of the human body detection result represents the reliability of the result of the human body detection, i.e., the correctness of determination of whether or not a detected subject is a human body. The degree of reliability may be calculated by any technique. For example, the degree of reliability may be calculated to have a higher numerical value as the degree of matching a template previously stored increases.

It may be determined whether or not the degree of reliability is high, based on whether or not the degree of reliability is higher than a predetermined reliability degree threshold that is previously set for human body detection results. For example, if the degree of reliability ranges from 0 to 9 (0 means the highest degree of reliability), the reliability degree threshold is set to 2. Note that the reliability degree threshold may be empirically determined.

(Condition 3: Degree of Reliability of Face Detection Result)

Similar to the human body detection result, the face area correction is not performed on the face detection result if the degree of reliability of the face detection result is low, and the face area correction is performed if the degree of reliability is high. It is considered that if the degree of reliability of the face detection result is low, the degree of reliability will be still low after the correction. Therefore, the correction is not performed on the face area.

The degree of reliability of the face detection result represents the reliability of the result of the face detection, i.e., the correctness of determination of whether or not a detected subject is a face. The degree of reliability may be calculated by any technique. For example, the degree of reliability may be calculated to have a higher numerical value as the degree of matching a template previously stored increases. Note that the degree of reliability is calculated, taking into consideration not only the case where the face points in a front orientation but also the case where the face points in a sideways orientation.

Similar to the human body detection result, it may be determined whether or not the degree of reliability of the face detection result is high, based on whether or not the degree of reliability is higher than a predetermined reliability degree threshold that is previously set for face detection results. For example, if the degree of reliability of the face detection result ranges from 0 to 9 (0 means the highest degree of reliability), the reliability degree threshold is set to 4. Note that the reliability degree threshold may be empirically determined. The human body detection result and the face detection result may have the same or different reliability degree ranges and reliability degree thresholds. The degree of reliability of face detection varies greatly. Therefore, priority may be given to the stability of face detection, and for example, the reliability degree threshold of the face detection may be set to be lower (a larger numerical value).

(Condition 4: Difference Between Size of Face Area Based on Face Detection Result and Size of Face Area Estimated Based on Human Body Detection Result)

If the difference is large, the face area correction is not performed. If the difference is small, the face area correction is performed.

For example, if the human body detector 117 detects parts above the chest of a person, a horizontal size and a vertical size of a face area can be estimated to be n/3 and m/2, respectively, where n and m are a horizontal size and a vertical size, respectively, of a detected human body area.

Thereafter, these sizes are compared with those of a face area having the same identifier ID that is based on the face detection result. If differences in these sizes are larger than predetermined thresholds, it is likely that an error has occurred in either the face detection or the human body detection or that an error has occurred in the result of the same-subject determining process, and therefore, the face area correction is not performed.

For example, if a size (area) of the face area is different from a face size (area) estimated based on the human body detection result by a factor of two or more, it may be determined that the size difference is large. Note that this is merely illustrative, and the threshold is empirically determined.

In the above example, the determination is performed based on a difference between a size of a face area of a face detection result and a size of a face area estimated based on a human body detection result. Alternatively, the latter may be a size of a human body area. In this case, if a horizontal size and a vertical size of the human body area are 4o or more and 3p or more, respectively, it may be determined that the size difference is large, where o and p are a horizontal size and a vertical size, respectively, of the face area of the face detection result.

(Condition 5: Difference Between Center Position of Face Area Based on Face Detection Result and Center Position of Human Body Area)

If the difference is large, the face area correction is not performed. If the difference is small, the face area correction is performed.

If the difference is large, it is likely that an error has occurred in either the face detection or the human body detection, or the same-subject determining process result is incorrect, and therefore, the face area correction is not performed.

For example, if a difference in vertical or horizontal component between the center location of a face area and the center location of a human body detection result is larger than ⅝ of the vertical or horizontal size of the human body detection result, it is determined that the difference is large. Note that the threshold is not limited to this, and may be empirically determined. Note that the intersection of the diagonal lines of a rectangle circumscribing an area, or the center of gravity, may be used as a center of a face area or a human body area.

In the above description, the determination is performed based on the difference in center location between a face area and a human body detection result. Alternatively, a face area may be estimated based on a human body area as described above, and a center location of the estimated face area may be compared. This provides a similar effect.

Note that, in order to improve the correctness of the face area correction determining process, the result that the face area correction is successively performed a plurality of times under the same condition may be regarded as the result of determining that the face area correction is performed. As a result, the likelihood of erroneous correction of a face area can be reduced.

Next, the face area correction technique will be described with reference to FIGS. 7A and 7B.

FIG. 7A schematically shows face frames indicating example locations and sizes before and after correction of the face area detected by the face detector 116. The face area before correction (uncorrected face area) is indicated by reference numeral 701, and the face area after correction (corrected face area) is indicated by reference numeral 702.

Figure 7B:
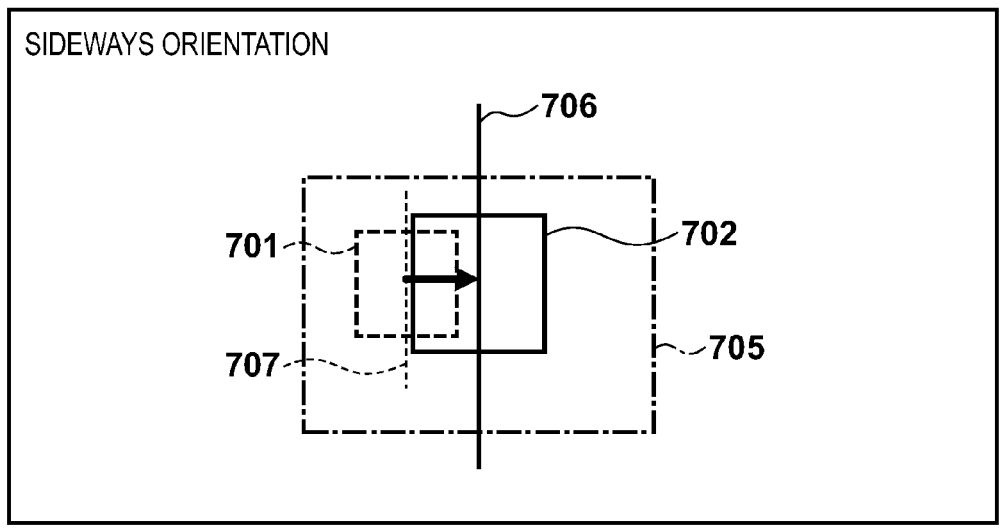

As shown in FIG. 7B, a horizontal component (horizontal coordinate) of a center location 707 of the uncorrected face area 701 is corrected to coincide with a horizontal component (horizontal coordinate) of a center location 706 of a human body area 705 based on a human body detection result having the same identifier ID. A size of the corrected face area 702 is corrected to a face size estimated based on the human body area 705.

Note that this correction technique is merely illustrative, and the center location of the corrected face area may not be caused to coincide with the center location of the human body area in the horizontal direction. For example, based on the center locations and sizes of a face area and a face area estimated based on a human body detection result, a horizontal coordinate of an upper left corner of each area may be calculated, and the face area may be corrected so that the upper left corner thereof is located at a location obtained by averaging the calculated results. The amount of correction may be determined based on how far the center of the face area is located away from the center of the human body area.

Similarly, the size of the corrected face area may not be equal to a face size estimated based on the human body area. For example, the size of the corrected face area may be corrected to an average of the size of the uncorrected face area and the face size estimated based on the human body area. The amount of correction may be determined based on how much the size of the face area is different from the face size estimated based on the human body area.

The face area correction may be carried out by performing a correction procedure once. Alternatively, the face area correction may be carried out by performing a correction procedure a plurality of times and in a stepwise manner to correct the corrected location and size. As a result, the influence of over-correction or erroneous correction can be reduced.

Instead of using a center location of a human body area as a reference, a location of a face area may be corrected using a face location estimated based on the human body area as a reference. For example, a face area may be estimated based on a human body area, and a detected face area may be corrected so that a center location thereof coincides with a center location of the estimated face area.

Figure 2:
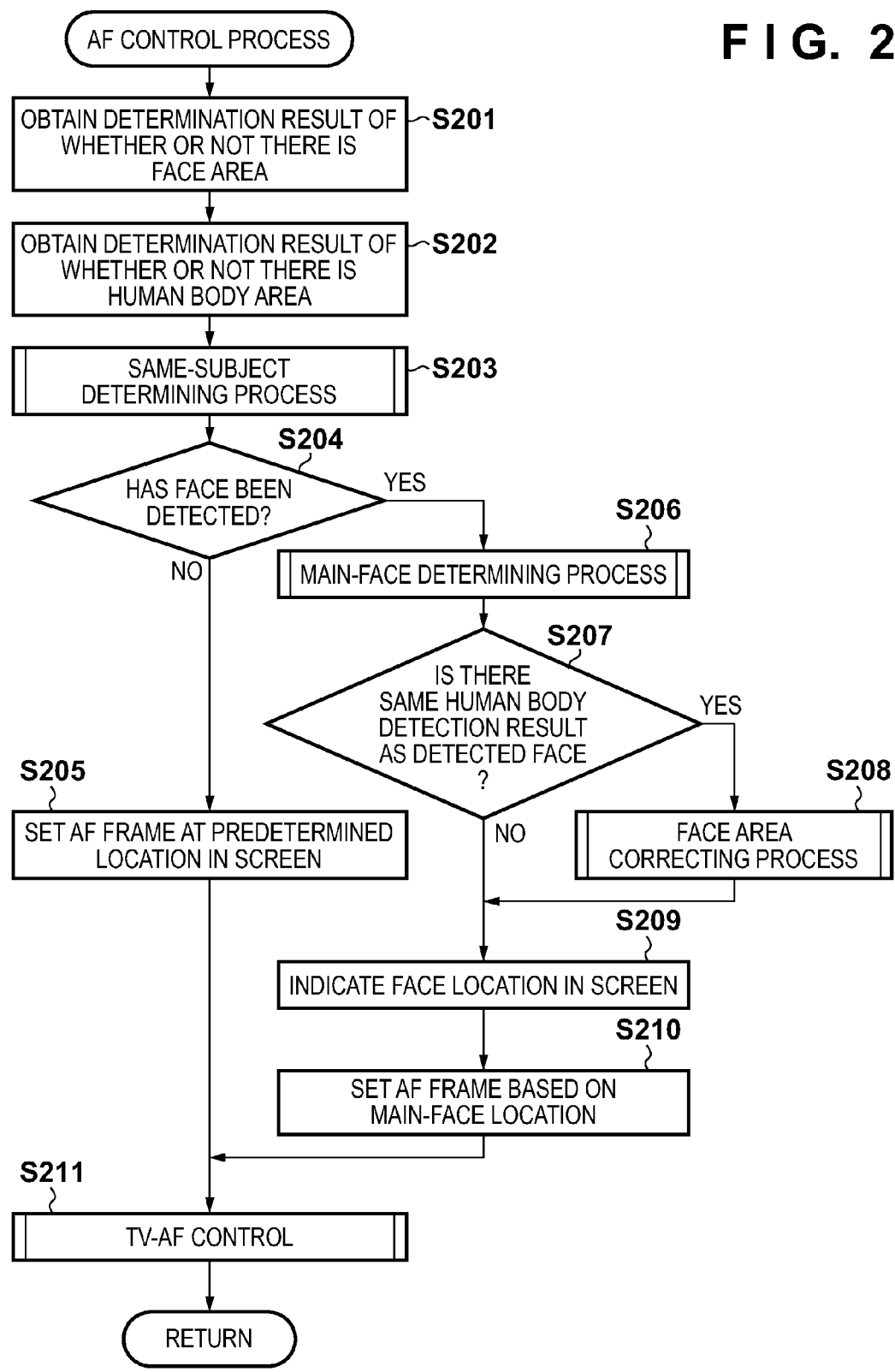
FIG. 2 is a flowchart showing an AF control process in a first example.
Figure 3:
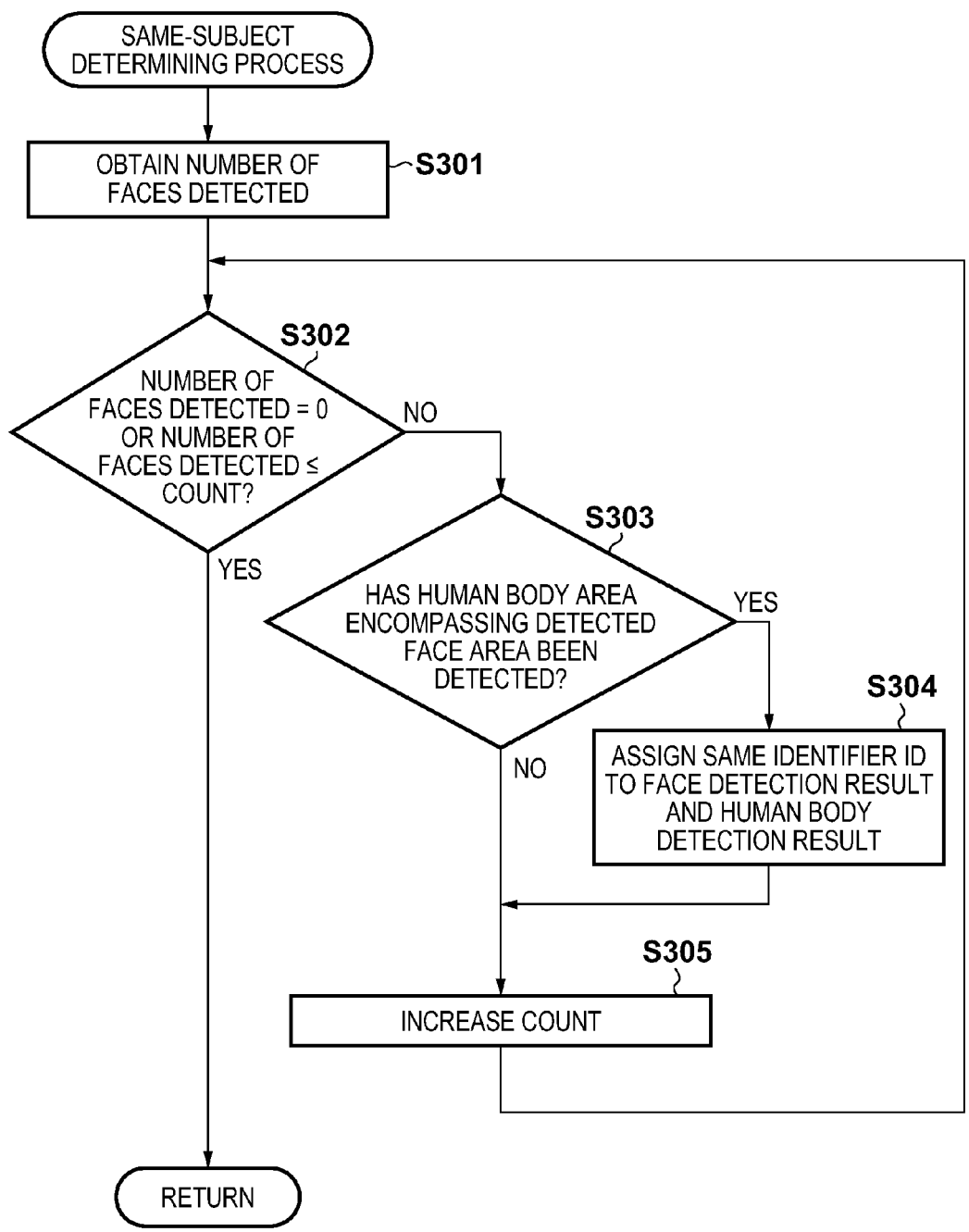
FIG. 3 is a flowchart showing a same-subject determining process in the first example.

FIG. 8 is a diagram for describing the micro-drive operation of the focusing lens 105 performed in the TV-AF control of S211 of FIG. 2. In FIG. 8, the horizontal axis represents time, and the vertical axis represents positions of the focusing lens 105. FIG. 8 also shows a vertical synchronization signal for an image signal in an upper portion thereof. In the micro-drive operation, the controller 114 calculates AF evaluation values while moving the focusing lens driver 111 within a predetermined micro-drive range toward the infinity position and toward the minimum focus distance position. Thereafter, by comparing an AF evaluation value obtained at the infinity position with an AF evaluation value obtained at the minimum focus distance position, the controller 114 determines a direction of lens positions that provide larger AF evaluation values, or searches for a lens position (peak position) that provides a largest AF evaluation value.

Note that the control of micro-driving the focusing lens 105 in order to determine whether or not the in-focus state has been established, based on changes in AF evaluation value, may be called an in-focus determination control. The control of micro-driving the focusing lens 105 in order to determine a direction in which there is an in-focus position, based on changes in AF evaluation value, may be called an in-focus direction determination control.

As shown in FIG. 8, an AF evaluation value $EV_A$ corresponding to charge (indicated by a hatched ellipse in FIG. 8) accumulated in the image sensor 106 during a time period A in which the lens is stopped at the infinity position, is taken in at time $T_A$. An AF evaluation value $EV_B$ corresponding to charge accumulated in the image sensor 106 during a time period B in which the lens is stopped at the minimum focus distance position, is taken in at time $T_B$. An AF evaluation value $EV_C$ corresponding to charge accumulated in the image sensor 106 during a time period C in which the lens is stopped at the infinity position again, is taken in at time $T_C$.

Thereafter, at time $T_D$, the controller 114 compares the AF evaluation values $EV_A$, $EV_B$, and $EV_C$. If $EV_A > EV_B$ and $EV_C > EV_B$, the controller 114 moves the center of drive (vibration) of micro-drive from a current point "a" by a predetermined amount in a direction in which larger AF evaluation values are obtained (here, toward the infinity position), to reach a point "b." On the other hand, if $EV_A < EV_B$ or $EV_B < EV_C$, the controller 114 does not move the vibration center.

Next, the hill-climbing drive operation that is used in combination with the micro-drive operation in the TV-AF control will be described with reference to FIG. 9. If the in-focus direction has been determined by the micro-drive operation, control transitions to the hill-climbing drive operation.

FIG. 9 is a diagram showing examples of the magnitudes of AF evaluation values and the drive operation of the focusing lens 105 during the hill-climbing drive operation. In the hill-climbing drive operation, AF evaluation values are calculated while the focusing lens 105 is driven, and a focusing lens position (peak position) at which a peak AF evaluation value is obtained, or a position in the vicinity of the peak position, is detected.

In FIG. 9, when the focusing lens 105 is driven in the right direction in the figure from a starting position of hill-climbing drive, as indicated by an arrow A the AF evaluation value goes over a peak (maximum value) and then down. In this case, assuming that the focusing lens 105 has passed the in-focus position, the hill-climbing drive operation is ended, and the focusing lens 105 is placed back to a position where the maximum AF evaluation value was obtained, and control transitions to the micro-drive operation.

On the other hand, when the focusing lens 105 is driven in the left direction in the figure from the starting position of hill-climbing drive, as shown in an arrow B the AF evaluation value goes down without going over the peak. In this case, the controller 114 determines that the focusing lens 105 has been moved in a wrong direction, and continues the hill-climbing drive operation in the opposite direction. Note that, in the hill-climbing drive operation, the amount of movement per predetermined time period of the focusing lens 105 is larger than that in the micro-drive operation.

Thus, the controller 114 repeatedly performs determination of whether to start over (start micro-drive again from the beginning)→micro-drive→hill-climbing drive→micro-drive→determination of whether to start over, thereby performing the AF control operation of moving the focusing lens 105 to a position where a maximum AF evaluation value is obtained.

As described above, in this example, a plurality of detection techniques of separately detecting an image area of the same subject (e.g., the face detection and the human body detection) can be used in combination to improve the accuracy of detection of a subject area.

The face detection result is corrected based on the human body detection result. Therefore, for example, even when the face points in a sideways orientation, the background contained in the subject area can be reduced or removed. Therefore, when autofocus detection is performed on a detected subject area, the likelihood that the background is in focus can be reduced, and therefore, the subject area can be stably caused to be in focus. When an automatic exposure control is performed in order to achieve correct exposure for the detected subject area, the influence of the luminance of the background on the exposure control can be reduced, and therefore, the exposure control can be more appropriately performed. When an evaluation area is set for the detected subject area, and a color control (e.g., a human face skin color correcting process) is performed based on a signal in the evaluation area, the influence of the color of the background can be reduced, and therefore, the color control can be more appropriately performed.

The face detection result is corrected based on the human body detection result of the same subject. Therefore, for example, an unstable TV-AF result based on a low-contrast area, such as the back of the head of a subject facing back, which may occur when a face area estimated based on the human body detection result is used, can be reduced.

The indication of the detected subject area can have an appropriate location and size, and therefore, the unnaturalness to the user can be reduced.

In this example, as an example technique of separately detecting a subject area, the face detection and the human body detection have been illustrated. However, the techniques of separately detecting a subject area are not limited to such a combination.

For example, a combination of a technique of detecting a subject area to be detected (e.g., a face area) and a technique of detecting an area encompassing the subject area to be detected, in which a location or a size of the subject area to be detected can be estimated (e.g., a head area, an upper body area, a whole body area, etc.), may be used.

Different techniques (e.g., a detection technique using pattern matching, a detection technique using a contour, etc.) may be combined.

<AF Control Process in Second Example>

Next, an AF control process in a second example will be described with reference to a flowchart shown in FIG. 11. In the AF control process of this example, a face frame (first focus detection area) and a mini-face frame (second focus detection area) encompassed in the face frame are set based on a face area, and are used as AF frames.

Figure 11:
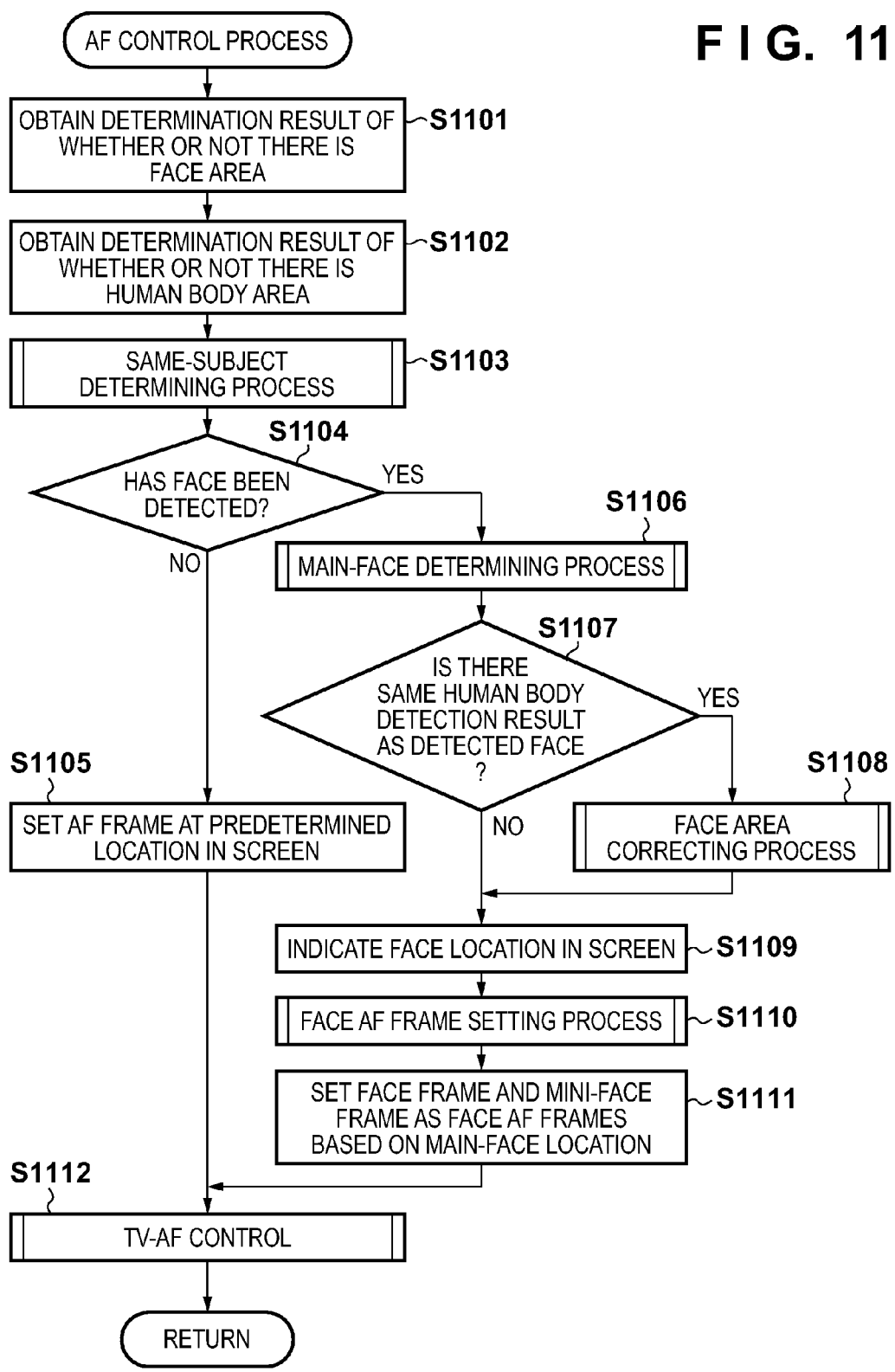
FIG. 11 is a flowchart showing an AF control process in a second example.

Steps S1101 to S1109 of FIG. 11 are similar to steps S201 to S209 of FIG. 2 and therefore will not be described.

In S1110, the controller 114 performs a face AF frame setting process of determining locations of a face frame and a mini-face frame. The face AF frame setting process will be described in detail below with reference to FIG. 12.

Next, in S1111, the controller 114 sets the face frame and the mini-face frame determined in S1110 for a face area of a main face determined in S1106, and control proceeds to step S1112. In S1112, as described below, the controller 114 performs a TV-AF control, taking the face frame and the mini-face frame into consideration.

Figure 12:
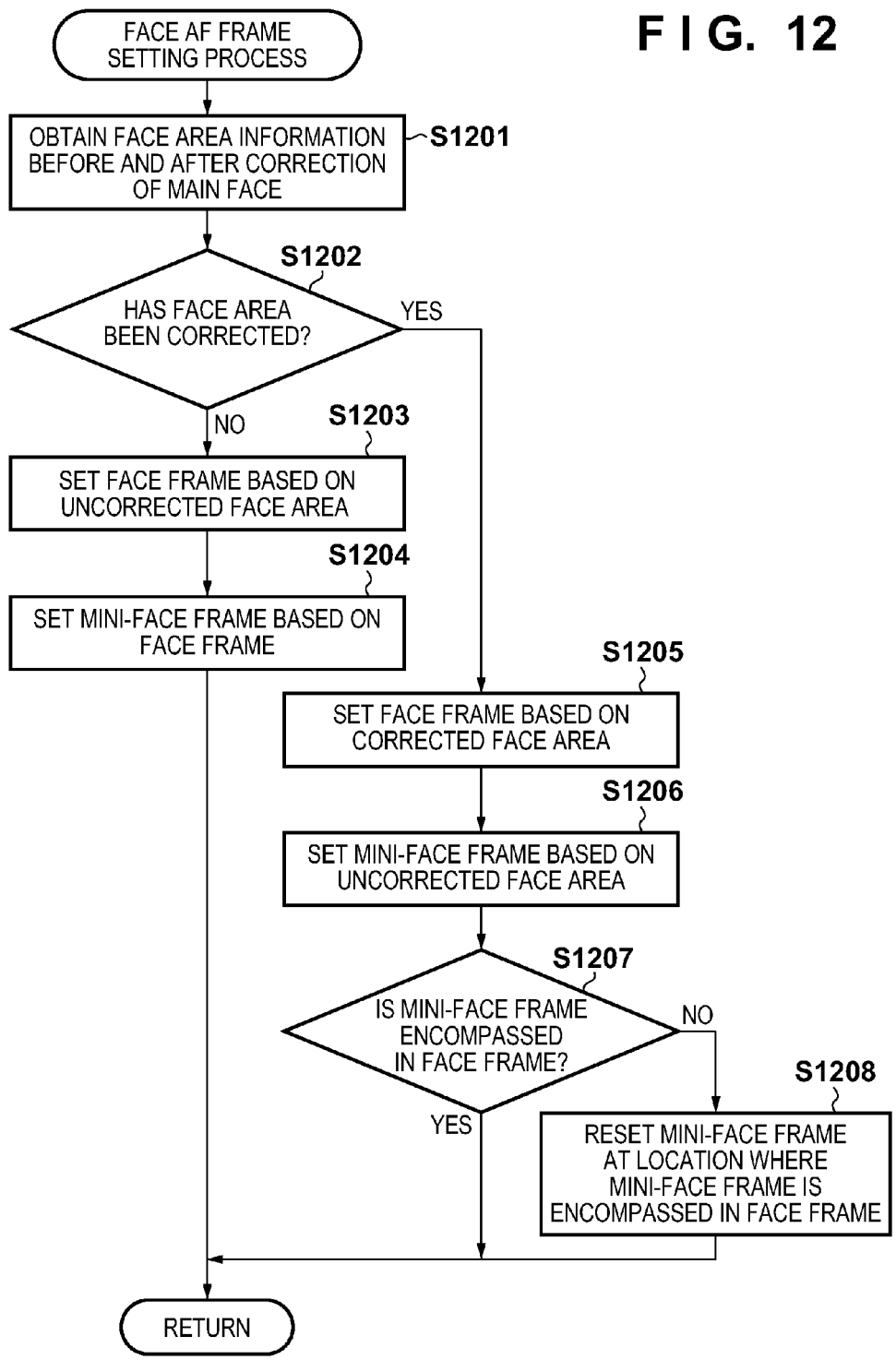
FIG. 12 is a flowchart showing a face AF frame setting process in the second example.

Next, the face AF frame setting process in S1110 of FIG. 11 will be described with reference to a flowchart shown in FIG. 12.

In S1201, the controller 114 obtains, for the face area of the main face determined in S1106, information about the face area that has not yet been subjected to the correction process of S1108 and information about the face area that has been subjected to the correction process of S1108.

In S1202, the controller 114 determines whether or not the face area has been corrected, based on the information about the face area before and after the correction process. If the determination result is negative (No in S1202), control proceeds to step S1203 where the controller 114 sets a face frame based on the uncorrected face area, and in S1204, sets a mini-face frame based on the face frame. The technique of setting a face frame and a mini-face frame will be described below.

Otherwise, i.e., if the determination result is positive (Yes in S1202), control proceeds to step S1205 where the controller 114 sets a face frame based on the corrected face area, and in S1206, sets a mini-face frame based on the uncorrected face area.

In S1207, the controller 114 determines whether or not the mini-face frame set in S1206 is included in the face frame set in S1205. If the determination result is positive (Yes in S1207), the controller 114 ends the face AF frame setting process, and control proceeds to step S1111. Otherwise (No in S1207), the controller 114 causes the procedure to proceed to step S1208.

In S1208, the controller 114 resets a location of the mini-face frame to a location where the mini-face frame is encompassed in the face frame. For example, if a horizontal coordinate of a left end of the mini-face frame is to the left of a horizontal coordinate of a left end of the face frame, the controller 114 resets the location of the mini-face frame so that the left end of the mini-face frame coincides with the left end of the face frame. The controller 114 also similarly reset a location of the mini-face area in the vertical direction.

Next, an example technique of setting the face frame and the mini-face frame in S1203, S1204, S1205, and S1206 will be described with reference to FIGS. 13A and 13B.

FIG. 13A shows a case where the face area is not corrected and the face points in a front orientation. In this case, a center location of a face frame 1301 is set based on a center location of the face area. Although, in this example, the face frame 1301 is set so that the center location of the face frame 1301 coincides with the center location of the face area, the face area and the face frame 1301 may have other locational relationships. A size of the face frame 1301 is set to a size that is obtained by multiplying a size of the face area by a predetermined factor (e.g., 1.3). If the face frame is small, an image in the face frame is likely to vary depending on movement of the face, and therefore, the AF evaluation value, which is susceptible to such variation, is likely to fluctuate, leading to an unstable AF control. Therefore, in this example, the face frame is set to be larger than the face area.

A center location of a mini-face frame 1302 is set based on the center location of the face frame 1301. Although, in this example, the mini-face frame 1302 is set so that the center location of the mini-face frame 1302 coincides with the center location of the face frame 1301, the mini-face frame 1302 and the face frame 1301 have other locational relationships as long as the mini-face frame 1302 is encompassed in the face frame 1301. A size of the mini-face frame 1302 is set to be smaller than a size of the face frame 1301. Although, in this example, the vertical and horizontal lengths of the mini-face frame 1302 are ½ of the vertical and horizontal lengths, respectively, of the face frame 1301, this is merely illustrative.

As described above, a face frame is set to be located at a location based on a detected face area and to be larger than the face area. Therefore, there is a possibility that an image in the face frame includes the background, and therefore, it is difficult to cause a face to be in focus due to an influence of the background.

A central part (e.g., the eyes, mouth, nose, etc.) of a face and a peripheral portion (e.g., the ears, etc.) of a face have a slight difference in focal point. Therefore, if autofocus detection is performed using an AF evaluation value obtained from a face frame, the ear may be in focus instead of a central part of a face.

Therefore, in this example, a mini-face frame is set to be encompassed (i.e., entirely included) in a face frame. By additionally using an AF evaluation value of the mini-face frame, a central part of a face can be caused to be stably in focus.

On the other hand, FIG. 13B shows an example case where a face points in a sideways orientation and therefore a face area is corrected.

A corrected face frame 1303 is set based on the corrected face area, similar to the face frame 1301 of FIG. 13A (i.e., here, a center location of the face frame 1303 is set to coincide with a center location of the corrected face area).

On the other hand, a mini-face frame 1305 is set based on a face frame 1304 that is set based on an uncorrected face area, similar to the mini-face frame 1302 of FIG. 13A (i.e., here, a center location of the mini-face frame 1305 is set to coincide with a center location of the face frame 1304). Although, in this example, the mini-face frame 1305 is set so that the center location of the mini-face frame 1305 coincides with the center location of the uncorrected face frame 1304, the uncorrected face frame 1304 and the mini-face frame 1305 may have other locational relationships. A size of the mini-face frame 1305 is set to be smaller than a size of the uncorrected face frame 1304. Although, in this example, the vertical and horizontal lengths of the mini-face frame 1305 are set to be ½ of the vertical and horizontal lengths, respectively, of the face frame 1304, this is merely illustrative.

Thus, if a face area has been corrected when, for example, a face points in a sideways orientation, a face frame is set based on the face area that has been corrected so that the background is not included in the face area. On the other hand, a mini-face frame is set based on a face frame that has been set based on an uncorrected face area. This is because a mini-face frame is less likely to include the background than is a face frame, and in addition, is more likely to include a characteristic portion of a face, such as the eyes, mouth, nose, or the like. If a mini-face frame is set based on a face frame that has been set based on a corrected face area (e.g., a center location of the mini-face frame is set to coincide with a center location of the corrected face area), then when the person faces sideways, the mini-face frame is highly likely to be located at the cheek. In this case, an image in the mini-face frame has low contrast, resulting in a reduction in accuracy of focusing on a human face. As a result, a central part of a face is highly likely to be out of focus, or the background is highly likely to be in focus.

Note that, in this example, when a face area has been corrected, a mini-face frame is set based on an uncorrected face area. However, alternatively, a location of a mini-face frame based on an uncorrected face area may be corrected in the same direction as that of a face frame by a correction amount (a difference in location between an uncorrected face frame and a corrected face frame) that is smaller than that of the face frame. For example, if the correction amount of a face frame corresponds to 20 pixels, a location of a mini-face frame may be corrected by an amount corresponding to 10 pixels.

Here, a procedure of calculating an AF evaluation value for use in the micro-drive operation of FIG. 8, in the TV-AF control performed in S1112 of this example, will be described.

$$\text{AF evaluation value} = (\text{AF evaluation value of face frame}) + \alpha \ast (\text{AF evaluation value of mini-face frame}) \quad (1)$$

In Expression 1, $\alpha$ is a coefficient that is used to change a weight on the AF evaluation value of the mini-face frame. For example, when $\alpha=2.5$, the AF evaluation value of the mini-face frame can be weighted more than the AF evaluation value of the face frame.

Note that the face AF frame setting process of this example may be applied to the AF control process of the first example.

The face AF frame setting process of this example may also be applied to a case where a location of a face area is corrected, depending on, for example, an orientation of a face, without determining whether or not there is the same human body detection result as the detected face area as in S1107 shown in FIG. 11. In this case, for example, when the face points in a front orientation, the location correction amount of the face frame is set to 0. When the face points in a sideways orientation, a location of the face frame is corrected in a direction opposite to a direction in which the face points, by ⅛ of a size of the face, for example. Thereafter, a mini-face frame is set using a technique similar to that described above.

Note that the location correction amount of a face frame depending on the face orientation is merely illustrative, and other values may be used.

Thus, in this example, a mini-face frame that is encompassed in a face frame and is smaller than the face frame is set, and a TV-AF control is performed based on an AF evaluation value obtained by weighted addition of an AF evaluation value of the face frame and an AF evaluation value of the mini-face frame. The mini-face frame is more likely to exclude the background than is the face frame. Therefore, if an AF control is performed, taking into consideration the AF evaluation value of the mini-face frame, a face can be caused to be in focus with higher accuracy.

<AF Control Process in Third Example>

In the second example, the technique of using a face frame and a mini-face frame encompassed in the face frame as AF frames has been described. In this example, a problem with the mini-face frame described in the second example and a solution to the problem will be described.

In the second example, the mini-face frame is set to be smaller than the face frame. This reduces the likelihood that the background is included, and allows a central part (i.e., a characteristic part, such as the eyes, nose, mouth, etc.) of a face to be stably in focus. However, if a size of the mini-face frame is reduced, an image in the frame is likely to vary due to movement of the face, so that it is difficult to obtain a stable AF evaluation value and AF result.

Figure 14A:
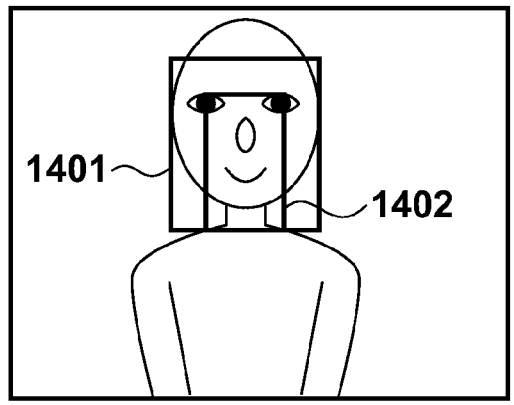
FIGS. 14A to 14D are diagrams for describing a problem in a third example.

Therefore, in this example, the mini-face frame is set to have a range from the chin to the shoulders in addition to central parts (the eyes, nose, and mouth) of a face, whereby a stable AF evaluation value can be obtained. Specifically, as shown in FIG. 14A, a horizontal size of a mini-face frame 1402 is set to be about ½ of that of a face frame 1401 as in the second example, and a vertical size of the mini-face frame 1402 is set to extend downward in a vertical direction by about ¼ of a vertical size of the face frame. Note that the extended mini-face frame is still encompassed in the face frame. Note that FIGS. 14A to 14D show images taken by a camera in the normal position.

Figure 14B:
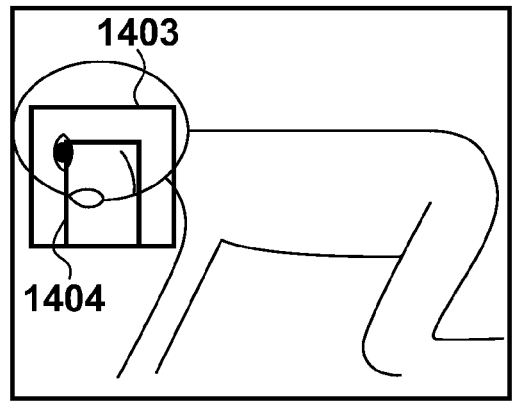
Figure 14C:
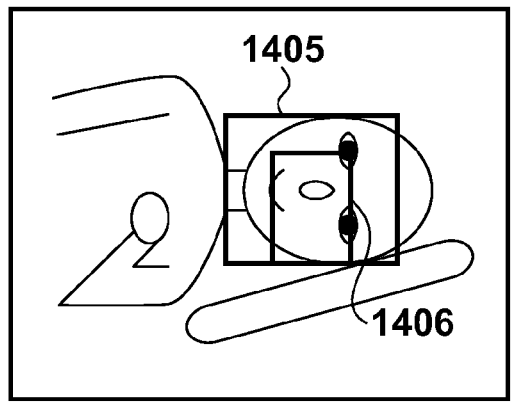
Figure 14D:
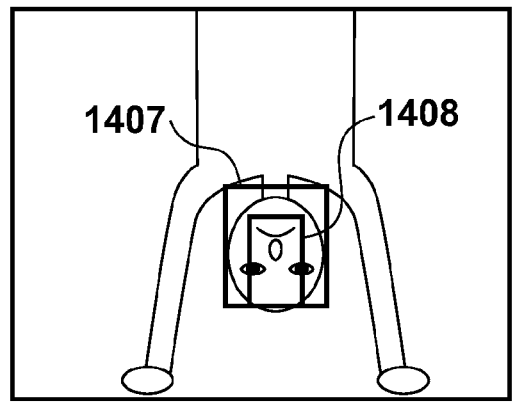

Here, when the mini-face frame is set as described above, the chin or shoulder of a subject may not be included in the mini-face frame at some shooting angles of the subject. FIGS. 14B, 14C, and 14D show face frames 1403, 1405, and 1407, respectively, and mini-face frames 1404, 1406, and 1408, respectively. For example, when a main subject is on all fours (FIG. 14B), lies on their side (FIG. 14C), or is doing a handstand (FIG. 14D), the mini-face frame does not include the chin or shoulder of the subject.

Therefore, in this example, a face AF frame correcting process is performed in which settings of a mini-face frame are corrected, depending on an orientation of a human body of a main subject (a posture or pose of a main subject).

Figure 15:
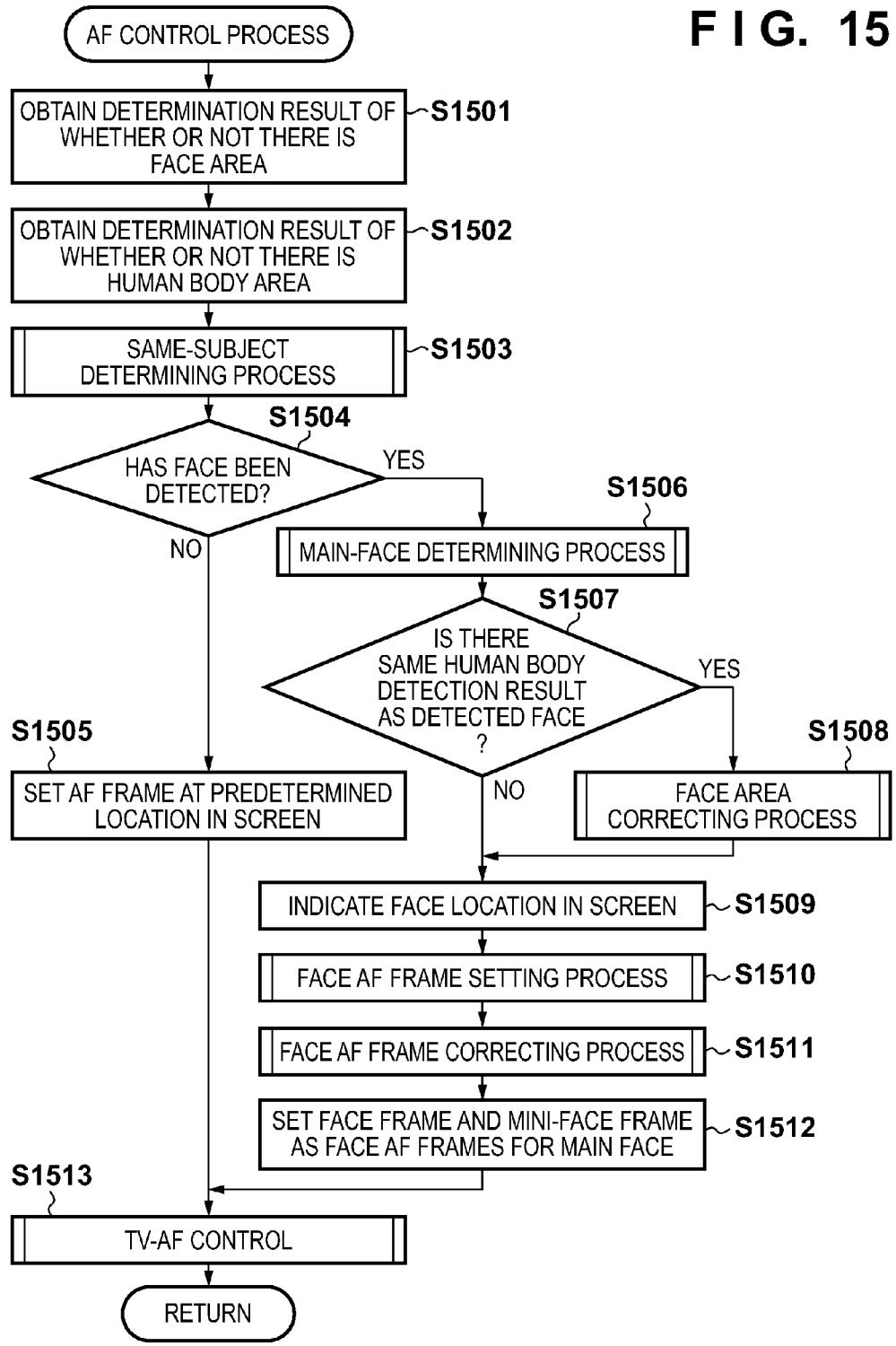
FIG. 15 is a flowchart showing an AF control process in the third example.

FIG. 15 shows a flowchart of an AF control process in this example. Steps S1501 to S1509 in the flowchart of FIG. 15 are similar to steps S201 to S209 of FIG. 2, and step S1510 is similar to step S1110 of FIG. 11 (i.e., the process of FIG. 12), and therefore, these steps will not be described.

Figure 16:
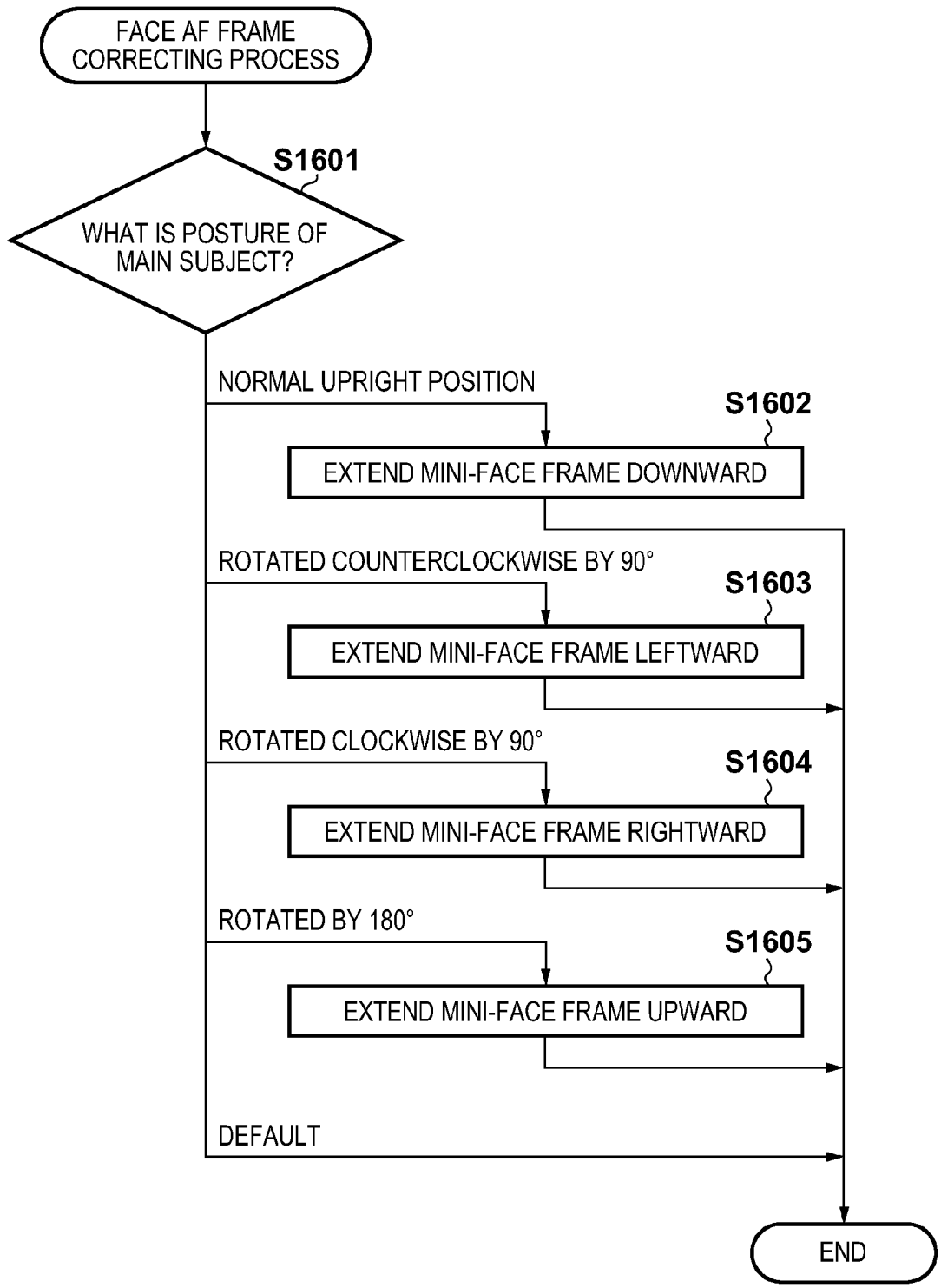
FIG. 16 is a flowchart showing a face AF frame correcting process in the third example.

A face AF frame correcting process performed in S1511 will be described with reference to a flowchart shown in FIG. 16. In S1601, the controller 114 determines a pose (detection angle) of a main subject based on the detection result of the human body detector 117. The detection angle can be determined based on a locational relationship between parts, such as the face, shoulders, and the like, which are obtained based on a contour of a human body detected by the human body detector 117. Note that information about a location of a face area may be obtained from the detection result of the face detector 116.

Specifically, when a human body is detected below a face as shown in FIG. 14A, the controller 114 determines that the main subject is in a normal upright position (detection angle: 0°). In this case, control proceeds to step S1602 where the controller 114 sets a horizontal size of the mini-face frame to be ½ of a horizontal size of the face frame, and sets a vertical size of the mini-face frame to extend downward to a boundary of the face frame.

On the other hand, when a human body is detected to the right of a face as shown in FIG. 14B, the controller 114 determines that a pose of the main subject is rotated counterclockwise by 90° (detection angle: 90° counterclockwise). In this case, control proceeds to step S1603 where the controller 114 sets a vertical size of the mini-face frame to be ½ of a vertical size of the face frame, and sets a horizontal size of the mini-face frame to extend leftward to a boundary of the face frame. Note that the vertical direction of a face corresponds to the vertical direction of a face frame, and therefore, the vertical direction of the face frame corresponds to the horizontal direction of the screen, and the horizontal direction of the face frame corresponds to the vertical direction of the screen.

When a human body is detected to the left of a face as shown in FIG. 14C, the controller 114 determines that a pose of the main subject is rotated clockwise by 90° (detection angle: 90° clockwise). In this case, control proceeds to step S1604 where the controller 114 sets a vertical size of the mini-face frame to be ½ of a vertical size of the face frame, and sets a horizontal size of the mini-face frame to extend rightward to a boundary of the face frame.

When a human body is detected above a face as shown in FIG. 14D, the controller 114 determines that a pose of the main subject is rotated by 180° (detection angle: 180°). In this case, control proceeds to step S1605 where the controller 114 sets a horizontal size of the mini-face frame to be ½ of a horizontal size of the face frame and sets a vertical size of the mini-face frame to extend upward to a boundary of the face frame.

Although, in the examples of FIGS. 14A to 14D, the mini-face frame is extended all the way across to a boundary of the face frame, a value that provides a high likelihood that a range from the chin to the shoulder is included may be, for example, empirically obtained to determine how much the mini-face frame is extended.

In S1512, the controller 114 sets, on the main face, the face and mini-face frames that have been determined in the above-described process. FIGS. 17A to 17D show example face frames 1701, 1704, 1707, and 1710, mini-face frames 1703, 1706, 1709, and 1712, and human body detection areas 1702, 1705, 1708, and 1711, respectively, for respective main subject poses, which are set on the main face. FIG. 17A shows a case where the detection angle is 0° (normal upright position). FIG. 17B shows a case where the detection angle is 90° counterclockwise. FIG. 17C shows a case where the detection angle is 90° clockwise. FIG. 17D shows a case where the detection angle is 180°. As can be seen from FIGS. 17A to 17D, in all the cases, the mini-face frames 1703, 1706, 1709, and 1712 are set to have an appropriate range from the eyes, nose, and mouth to the chin and the shoulders.

As described above, in this example, a pose of a human body is determined based on a relationship between locations of a detected face and human body that are obtained based on a human body detection result, and based on the determination result, a setting range of a mini-face frame is corrected. As a result, a main subject can be caused to be more stably in focus.

Note that the pose detection is not limited to a technique based on a contour of a human body area. Any other techniques may be used. For example, the face area detection result may be used in combination, or information other than the contour may be used as a basis for the posture detection.

In the above examples, as an example particular subject, a subject whose appearance varies depending on the orientation has been illustrated. The particular subject is not necessarily limited to this. According to the subject matter of the present invention, when one detection technique is likely to detect a subject area with low accuracy, the subject area is corrected using information about a subject area that is detected using another detection technique, whereby a more correct subject area can be stably detected.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-277439, filed on Dec. 19, 2012 and No. 2013-185710, filed on Sep. 6, 2013, which are hereby incorporated by reference herein their entirety.

What is claimed is:

1. An image processing apparatus comprising:
a first detection unit to detect an area of a first detection subject from an image;
a second detection unit to detect, from an image, an area of a second detection subject that allows for an estimation of the area of the first detection subject;
a correction unit to correct a location of the area of the first detection subject detected by the first detection unit;
a setting unit to set an evaluation area based on the area of the first detection subject; and
a control unit to perform at least one of a focus detection control, an exposure control, and a color control based on a signal of an image corresponding to the evaluation area,
wherein
the correction unit corrects the location of the area of the first detection subject based on information about the area of the second detection subject corresponding to the area of the first detection subject detected by the first detection unit.

2. The image processing apparatus according to claim 1, wherein
the correction unit additionally corrects a size of the area of the first detection subject based on information about the area of the second detection subject corresponding to the area of the first detection subject detected by the first detection unit.

3. The image processing apparatus according to claim 1, wherein
when it is determined that a degree of reliability of at least one of detection results of the first and second detection units is low, the correction unit limits correction of the area of the first detection subject.

4. The image processing apparatus according to claim 1, further comprising:
an indication control unit to provide an indication of the area of the first detection subject,
wherein
the correction unit corrects a location of the indication of the area of the first detection subject provided by the indication control unit, based on information about the area of the second detection subject corresponding to the area of the first detection subject detected by the first detection unit.

5. The image processing apparatus according to claim 1, further comprising:
a third detection unit to detect an orientation or an angle of the first detection subject detected by the first detection unit,
wherein
the correction unit limits correction of the area of the first detection subject based on a detection result of the third detection unit.

6. The image processing apparatus according to claim 5, wherein
the correction unit, when the third detection unit detects that the first detection subject detected by the first detection unit faces front, limits correction of the area of the first detection subject.

7. The image processing apparatus according to claim 1, wherein
the correction unit, when a difference in at least one of a size and a center location between the area of the first detection subject and the area of the second detection subject is larger than a predetermined value, limits a correction of the area of the first detection subject.

8. The image processing apparatus according to claim 1, wherein
the first detection subject includes a human face, and the second detection subject includes a human body.

9. The image processing apparatus according to claim 1, wherein
the setting unit sets a first evaluation area and a second evaluation area smaller than the first evaluation area, based on the area of the first detection subject, and
the control unit performs the control based on a signal obtained from the first evaluation area and a signal obtained from the second evaluation area.

10. The image processing apparatus according to claim 9, wherein
when the correction unit corrects the location of the area of the first detection subject, the setting unit sets the first evaluation area based on the area after the correction of the first detection subject, and sets the second evaluation area based on the area before the correction of the first detection subject.

11. The image processing apparatus according to claim 9, wherein
the setting unit sets the second evaluation area to be included in the first evaluation area.

12. The image processing apparatus according to claim 9, wherein
when the correction unit does not correct the location of the area of the first detection subject, the setting unit sets the second evaluation area based on the first evaluation area.

13. The image processing apparatus according to claim 9, further comprising:
a fourth detection unit to detect an orientation or an angle of the second detection subject detected by the second detection unit,
wherein
the setting unit sets the second evaluation area based additionally on a detection result of the fourth detection unit.

14. An image pickup apparatus comprising:
the image processing apparatus according to claim 1; and an image capture unit adapted to perform photoelectric conversion on an optical image of a subject to generate an image to be provided to the image capture unit.

15. A method for controlling an image processing apparatus, comprising:
- a first detecting step of detecting an area of a first detection subject from an image;
- a second detecting step of detecting, from an image, an area of a second detection subject that allows for estimation of the area of the first detection subject;
- a correcting step of correcting a location of the area of the first detection subject detected in the first detecting step;
- a setting step of setting an evaluation area based on the area of the first detection subject; and
- a control step of performing at least one of a focus detection control, an exposure control, and a color control based on a signal of an image corresponding to the evaluation area, wherein
- in the correcting step, the area of the first detection subject is corrected based on information about the area of the second detection subject corresponding to the area of the first detection subject detected in the first detecting step.

16. A non-transitory computer-readable storage medium storing a program that causes a computer to execute the steps of the method according to claim 15.

* * * * *